US012520409B2

(12) United States Patent
Andrikowich et al.

(10) Patent No.: US 12,520,409 B2
(45) Date of Patent: Jan. 6, 2026

(54) ELECTRONIC DEVICE WITH ELECTROSTATIC DISCHARGING DETENT SPRING

(71) Applicant: Bose Corporation, Framingham, MA (US)

(72) Inventors: Thomas George Andrikowich, Whitinsville, MA (US); Daniel D. Gonsalves, Hudson, NH (US)

(73) Assignee: Bose Corporation, Framingham, MA (US)

( * ) Notice: Subject to any disclaimer, the term of this patent is extended or adjusted under 35 U.S.C. 154(b) by 244 days.

(21) Appl. No.: 18/084,021

(22) Filed: Dec. 19, 2022

(65) Prior Publication Data

US 2023/0131605 A1 Apr. 27, 2023

Related U.S. Application Data

(63) Continuation-in-part of application No. 16/930,579, filed on Jul. 16, 2020, now Pat. No. 11,627,400.

(51) Int. Cl.

*H05F 3/02* (2006.01)
*H04R 1/10* (2006.01)
*H04R 3/00* (2006.01)

(52) U.S. Cl.

CPC ................ *H05F 3/02* (2013.01); *H04R 1/10* (2013.01); *H04R 3/007* (2013.01)

(58) Field of Classification Search

None

See application file for complete search history.

(56) References Cited

U.S. PATENT DOCUMENTS 5,604,813 A 2/1997 Evans et al.
2007/0025561 A1 2/2007 Gauger, Jr.
2007/0047182 A1* 3/2007 Hassend ............ H01R 13/6675 361/600
2009/0268935 A1 10/2009 Dillinger
2013/0225007 A1 8/2013 Sylvester
2014/0079257 A1 3/2014 Ruwe et al.
2016/0286019 A1 9/2016 Broadley et al.
2017/0324437 A1 11/2017 Ruttler et al.

(Continued)

FOREIGN PATENT DOCUMENTS

CN 207978097 U 10/2018
CN 208094755 U 11/2018

(Continued)

OTHER PUBLICATIONS

PCT International Search Report and Written Opinion for Application No. PCT/US2023/081282, dated Mar. 20, 2024, 13 pages.

(Continued)

*Primary Examiner* — Fan S Tsang

(74) *Attorney, Agent, or Firm* — Hoffman Warnick LLC

(57) ABSTRACT

Various aspects include electronic devices with connection-enhancing, electrostatic discharge (ESD) protection features. In some examples, an electronic device includes: a housing; and a detent spring internal to the housing, where the detent spring (i) is positioned to contact a feature that is at least partially external to the housing and (ii) functions as an electrostatic discharge (ESD) sink.

19 Claims, 17 Drawing Sheets

(56) References Cited

U.S. PATENT DOCUMENTS

2019/0110930 A1 4/2019 Håkansson

FOREIGN PATENT DOCUMENTS

| | | | |
|---|---|---|---|
| CN | 209282257 | U | 8/2019 |
| WO | 2019222631 | A1 | 11/2019 |

OTHER PUBLICATIONS

PCT International Preliminary Report on Patentability for International Application No. PCT/US2021/041057, dated Jan. 26, 2023, 28 pages.

Screen shot of YouTube video demonstrating Bose ProFlight Aviation Headset, available on Jul. 14, 2020 at: https://www.youtube.com/watch?v=N7_LjT5Xe6g&feature=youtu.be&t=147.

Screen shot of product webpage for Bose ProFlight Series 2 Aviation Headset, available on Jul. 14, 2020 at: https://www.bose.com/en_us/products/headphones/aviation_headsets/proflight-aviation-headset-ii.html.

* cited by examiner

ELECTRONIC DEVICE WITH ELECTROSTATIC DISCHARGING DETENT SPRING

CROSS-REFERENCE TO RELATED APPLICATIONS

This application is a continuation-in-part (CIP) application of U.S. patent application Ser. No. 16/930,579 (Wearable Audio Device with Modular Component Attachment, filed Jul. 16, 2020), which is entirely incorporated by reference herein.

TECHNICAL FIELD

This disclosure generally relates to electronic devices. More particularly, the disclosure relates to electronic devices that provide electrostatic discharge (ESD) protection.

BACKGROUND

Electronic devices such as audio headsets can be prone to electrostatic discharge (ESD) events. In particular, electronic devices used in aviation, military applications, industrial applications, etc., can be prone to electrostatic charge buildup. This buildup can cause ESD events that negatively impact performance of the electronic devices. Even further, loose fitting connectors in electronic devices can cause rattling in devices used in dynamic environments (e.g., aviation, military, etc.), and also contribute to ESD events.

SUMMARY

All examples and features mentioned below can be combined in any technically possible way.

Various implementations of the disclosure include electronic devices with electrostatic discharge (ESD) protection and beneficially secure component connections.

Various additional implementations of the disclosure include aviation headsets with headphones that have a firm component connection and provide ESD protection.

In some particular aspects, an electronic device includes: a housing; and a detent spring internal to the housing, where the detent spring i) is positioned to contact a feature that is at least partially external to the housing and ii) functions as an electrostatic discharge (ESD) sink.

In certain particular aspects, an aviation headset includes: a pair of earphones; and a headband connecting the pair of earphones, where at least one of the earphones includes a slot having one or more snap-fit and/or friction-fit connectors for connecting with an electronic device, the electronic device having a housing; a feature that is at least partially external to the housing; and a detent spring internal to the housing, where the detent spring contacts the feature external to the housing and functions as an electrostatic discharge (ESD) sink, where the feature external to the housing is configured to engage with the one or more snap-fit and/or friction-fit connectors in the slot.

Implementations may include one of the following features, or any combination thereof.

In certain aspects, the ESD sink provides ESD protection from one or more components in the electronic device. In particular examples, the ESD sink directs ESD away from one or more components in the electronic device, for example, discharging electrostatic potential away from such component(s).

In some cases, the detent spring further acts as a limiter for the feature and provides ESD protection for components in the housing.

In particular implementations, the detent spring is contained in the housing.

In certain cases, the feature external to the housing enables coupling of the electronic device with an audio headset.

In some implementations, the housing includes a data connector for connecting with a complementary data connector in the audio headset. In some examples, the data connector includes a Universal Serial Bus (USB) connector and/or an audio connector.

In particular aspects, the detent spring is proximate to an opening in the electronic device and is configured to provide ESD protection for the audio headset through the opening.

In certain cases, the opening is obstructed when the electronic device is coupled with the audio headset.

In some aspects, the detent spring provides ESD protection of approximately 15 kilo-volts (kV) or more to the electronic device.

In some cases, the detent spring is grounded via a ground connection in the electronic device.

In particular aspects, the external movable component includes at least one movable arm for engaging a slot in a wearable audio device.

In certain implementations, the detent spring contacts each movable arm and provides friction against movement of the movable arm.

In some aspects, the electronic device further includes at least one fixed pin, where each movable arm includes a pivotable member for moving about the fixed pin, where the detent spring contacts the pivotable member.

In particular cases, the detent spring provides a force against each pivotable member that is normal to an axis or rotation of each pivotable member.

In certain implementations, each pivotable member includes a recess for accommodating an arm of the detent spring. In some examples, the recess spans only a portion of the circumference around the pivoting axis, e.g., approximately 30 degrees to approximately 120 degrees. In certain examples, the recess can vary depending on the amount of rotation of the arm.

In certain aspects, the detent spring further contacts the housing and wiring in the housing.

In particular cases, the feature external to the housing includes a movable external component that includes a metal. In some cases, the movable external component includes a plastic or composite material.

In some implementations, the electronic device further includes a first positional feature on the housing and a second positional feature on the detent spring, where the first positional feature and the second positional feature are complementary and aid in maintaining a position of the detent spring relative to the housing. In some examples, positional features can include male/female protrusions and/or slots.

In some aspects, the electronic device further includes a first retention feature on the housing and a second retention feature on the detent spring, where the first retention feature and the second retention feature are complementary. In some cases, the retention features include snap-fit and/or friction-fit connectors.

In some cases, the electronic device further includes a cable assembly connected to the housing, where the cable assembly includes a ground plane (e.g., a ground plate and/or a grounding wire).

In particular implementations, the detent spring includes a ground tab connected to the ground plane in the cable assembly. In some examples, the ground tab includes a solder tab.

In some aspects, the detent spring further includes a plate coupled to the housing and a set of arms extending from the plate and contacting the feature external to the housing.

In particular cases, the detent spring includes a set of arms and the set of arms only contact the feature external to the housing.

In some implementations, the electronic device includes at least one of: a boom microphone, a battery module, a power connector, a sensor module, a communications module, a self-powered communications module or a microphone module.

In certain aspects, a portion of the housing is configured to be inserted into a slot in a wearable audio device in an insertion direction, the slot having one or more snap-fit and/or friction-fit connectors, where the feature external to the housing includes a component having a movable arm configured to selectively engage the one or more snap-fit and/or friction-fit connectors, and where, when the movable arm is engaged with the one or more snap-fit and/or friction-fit connectors, the one or more snap-fit and/or friction-fit connectors provide a resistive force against the movable arm in response to a force on the portion in a direction opposite the insertion direction.

In particular cases, each of the snap-fit and/or friction-fit connectors includes at least one fixed protrusion within the slot that is sized to complement the movable arm in the electronic component in the locked position.

In some aspects, the detent spring acts as an ESD sink for the feature that is at least partially external to the housing.

In particular implementations, the detent spring acts as a limiter for the feature external to the housing and acts as an ESD sink from the at least one earphone.

In certain cases, the detent spring is contained in the housing.

In some aspects, the pair of earphones includes a pair of earcups.

In particular cases, the pair of earcups includes a pair of earbuds, a pair of on-ear headphones, or a pair of near-ear headphones.

In certain implementations, the aviation headset further includes an electro-acoustic transducer in each of the earcups for providing an audio output to a user.

In some cases, the detent spring provides ESD protection to the aviation headset in compliance with an aviation-specific ESD threshold.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
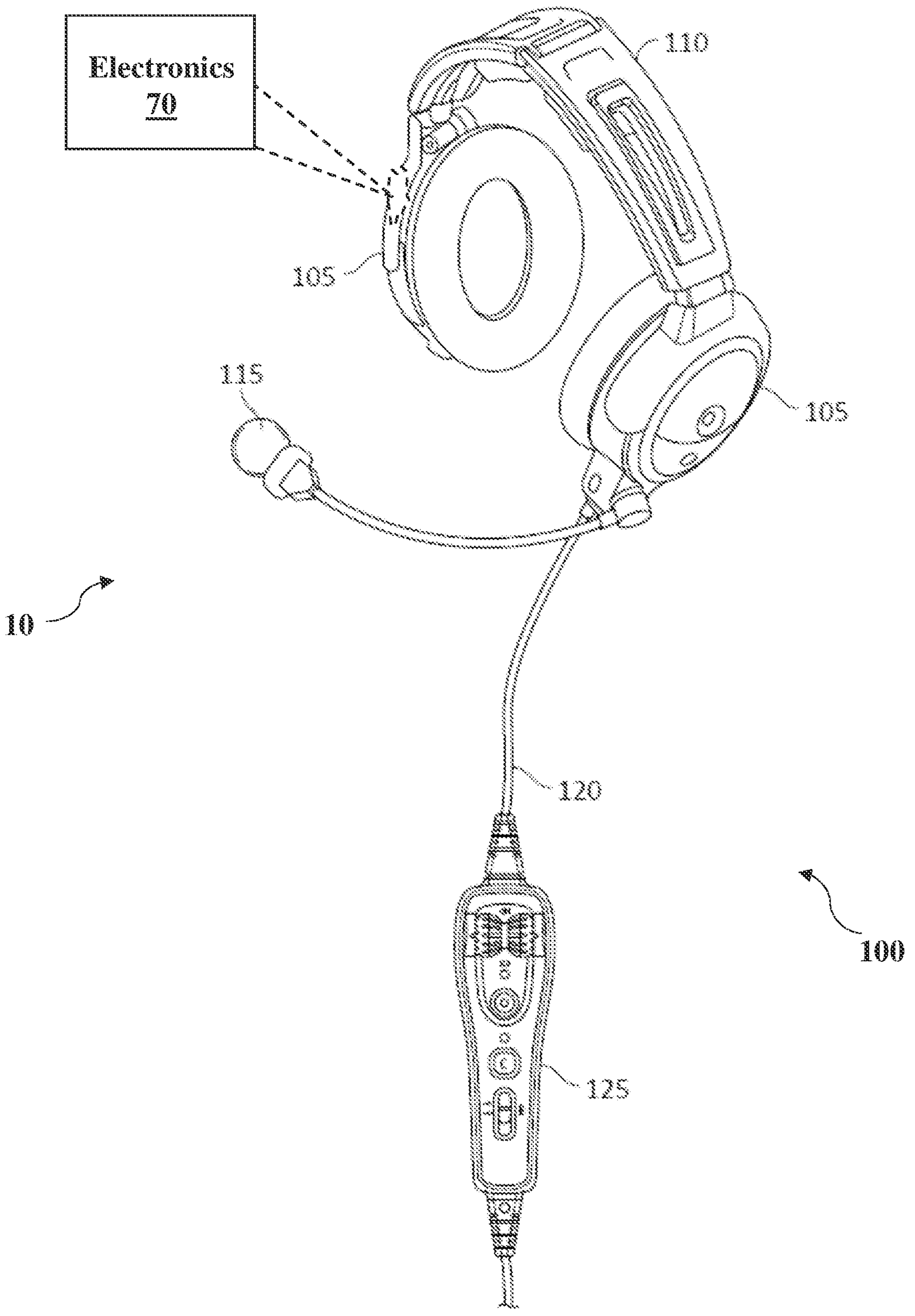
FIG. 1 is a schematic depiction of an audio device according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to electronic devices enabling electrostatic discharge protection (ESD) and beneficially secure component connections. More particularly, aspects of the disclosure relate to an electronic device with a detent spring that provides a beneficially firm connection and also functions as an ESD sink in the device. In certain cases, the electronic device includes or is otherwise part of a wearable audio device such as an audio headset.

The electronic devices described herein can include a detent spring that is both positioned to contact a feature that is at least partially external to the device housing, and functions as an ESD sink. The detent spring can provide a frictional force between the electronic device and the at least partially external feature(s), which mitigates free rotation and/or rattling of the electronic device relative to feature(s) and associated component(s). The ESD sink can provide ESD protection from one or more components in the electronic device. In particular examples, the ESD sink provides directed ESD away from one or more components in the electronic device, for example, discharging electrostatic potential away from such component(s).

As noted herein, an electronic device with a detent spring that act as ESD sink can be beneficially deployed in an aviation device such as an aviation headset. Certain environments such as aviation environments are prone to electrostatic build-up, for example, due to dry cabin air, dry surfaces in the cabin, and prolonged seating and shifting within a seat by an occupant (e.g., pilot). The build-up of significant electrostatic charge can cause large discharge events, also called ESD events herein. For example, when a pilot shifts in a seat, or gets out of a chair after prolonged seating, electrostatic charge built up in the pilot's headset may discharge proximate to the headband, earcups, boom microphone, etc. If such an ESD event is directed to electronics in the headset, that event can be significant enough to interrupt audio communications, produce garbled audio inputs or outputs to the headset, and/or cause a failure in one or more of the communications and/or data connection components in the headset. Various implementations aid in ESD routing away from such components in a headset, enhancing compliance with aviation safety standards as well as improving headset performance.

Commonly labeled components in the FIGURES are considered to be substantially equivalent components for the purposes of illustration, and redundant discussion of those components is omitted for clarity.

Aspects and implementations disclosed herein may be applicable to a wide variety of electronic devices. Particular examples of electronic devices include wearable audio devices and related connectors, modular components, auxiliary components, data connectors, audio connectors, etc. It is understood that any number of electronic devices that build up electrostatic charge can benefit from the disclosed implementations.

In some cases, such as where the electronic device includes a wearable audio device, the wearable audio devices can take various form factors, such as headphones (whether on or off ear), headsets, watches, eyeglasses, audio accessories or clothing (e.g., audio hats, audio visors, audio jewelry), neck-worn speakers, shoulder-worn speakers, body-worn speakers, etc. Some aspects disclosed may be particularly applicable to personal (wearable) audio devices such as over-ear headphones, on-ear headphones, in-ear headphones (also referred to as earbuds), audio eyeglasses or other head-mounted audio devices.

The wearable audio devices described according to various implementations can include features found in one or more other wearable electronic devices, such as smart glasses, smart watches, etc. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

As noted herein, conventional electronic devices (e.g., modular wearable audio devices) can include loose fitting and/or cumbersome attachment mechanisms, which in many cases, can cause poor mechanical and/or electrical connections. These poor connections can also negatively impact audio performance. Even further, conventional electronic devices such as wearable audio devices can produce electrostatic charges that can negatively impact performance and/or cause safety concerns for users.

Various implementations include electronic devices (e.g., wearable audio devices) and related systems that enable snap-fit and/or friction-fit connection between an audio earpiece and an electronic component. The snap-fit and/or friction fit connector provides a secure connection between the electronic component and the earpiece. In various implementations, the electronic device includes a detent spring that is both positioned to act as a contact feature (e.g., limiter) to secure the connection with the earpiece, and functions as an ESD sink for the earpiece and/or the electronic component.

Some example implementations relate to audio devices that include aviation headsets. Aviation headsets are used by pilots in both general aviation and commercial aviation. Such headsets can be connected to aircraft communication systems, for example to communicate with air-traffic control (ATC) or with other pilots. The headsets can also be used as a public addressing system, for example, for the pilots to speak with passengers on board the aircraft. The aircraft communication systems typically include an analog communication system such as an intercom. In some cases, such an intercom system can be configured to communicate over the very-high-frequency (VHF) bands (e.g., 18 MHz to 136.975 MHz) wherein each channel is separated from the adjacent ones by a band of pre-specified width (e.g., 8.33 kHz in Europe, 25 kHz elsewhere). An analog modulation technique such as amplitude modulation (AM) can be used for the communications, and the conversations may be performed in simplex mode. In some cases, for example, for trans-oceanic flights, other frequency bands such as high-frequency (HF) bands can be used for satellite communications. Aviation headsets may be used, for example, by pilots and air-traffic controllers to communicate with one another.

An example of a wearable audio device 10 that includes an aviation headset 100 is shown in FIG. 1. In particular cases, the headset 100 includes a frame that has at least one earpiece (e.g., ear-cup) 105 on each side, which fits on, around, or over the ear of a user. In some cases, the frame is optional, such that the earpiece 105 is either tethered or wirelessly connected to other components in the wearable audio device 10. Each of the ear-cups 105 houses acoustic transducers or speakers. The headset 100 also includes a headband (e.g., an over-the-head bridge) 110 for connecting the two earpieces (e.g., ear-cups) 105. In various implementations, the headset 100 is configured to position at least one, and in some cases both, earpieces 105 proximate ears of the user. For example, the headset 100 (and other headset forms of audio device 10 described herein) can be configured, when worn by a user, to position the earpiece(s) 105 proximate to a user's ear. In certain cases, this proximity includes positioning the earpiece(s) 105 on or over the ears (e.g., using earcups), in the ears (e.g., using earbuds), resting on the ears (e.g., using ear hooks), etc. In some cases, proximate positioning results in full, partial, or no occlusion of the user's ear.

In some implementations, an electronic component (e.g., a microphone such as a boom microphone) 115 may be physically connected to one of the ear-cups 105. The headset 100 can be connected to the aircraft intercom system using the connecting cable 120, which may also include a control module 125 that includes one or more controls for the headset 100. In certain cases, the analog signals to and from the aircraft intercom system are transmitted through the wired connection provided by the connecting cable 120. In other cases, or in additional cases, the headset 100 can include electronics 70, such as control chips and/or circuitry, electro-acoustic transducer(s), microphones and associated modules, power components such as batteries and/or connectors, interface components such as capacitive touch interface components, etc. In particular cases, the electronics 70 include a controller coupled with an electro-acoustic transducer, where the controller is also configured to connect with an electronic component when in a locked position with the audio device 10.

It is further understood that electronics 70 can include other components not specifically depicted in the accompanying FIGURES, such as communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. Electronics 70 can also include motion and/or position tracking components, such as optical tracking systems, inertial measurement units (IMUs) such as a microelectromechanical system (MEMS) device that combines a multi-axis accelerometer, gyroscope, and/or magnetometer, etc.

While the example in FIG. 1 illustrates an aviation headset that includes around-ear ear-cups, aviation headsets having other form-factors, including those having in-ear headphones or on-ear headphones, are also compatible with the technology described herein. In an example involving in-ear headphones, the over-the-head bridge may be omitted, and the boom microphone may be attached to the user via the headset or via a separate structure. Also, the term headset, as used in this document, includes various types of acoustic devices that may be used for aviation purposes, including, for example, earphones and earbuds. Additional headset features are disclosed, for example, in U.S. patent application Ser. No. 15/238,259 ("Communications Using Aviation Headsets," filed Aug. 16, 2016), which is incorporated herein by reference in its entirety.

It is further understood that any component described as connected or coupled to another component in the audio device 10 or other systems disclosed according to implementations may communicate using any conventional hardwired connection and/or additional communications protocols. In some cases, communications protocol(s) can include a Wi-Fi protocol using a wireless local area network (LAN), a communication protocol such as IEEE 802.11 b/g a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in audio device 10 are configured to communicate using one or more conventional wireless transceivers.

Figure 2:
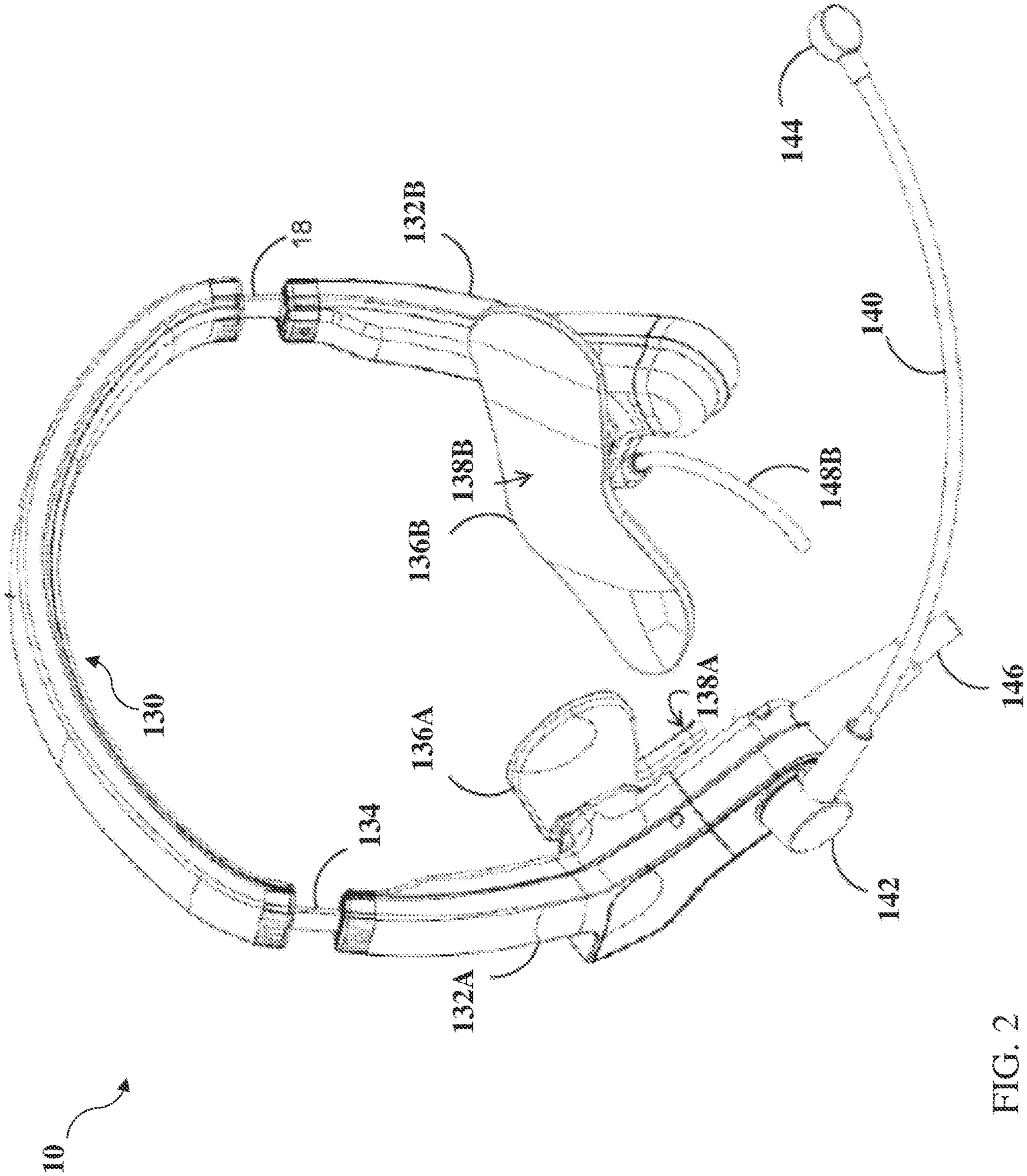
FIG. 2 is a schematic depiction of another audio device according to various implementations.

It is understood that the wearable audio devices 10 according to various implementations can take additional form factors. For example, FIG. 2 shows a wearable audio device 10 in the form of a personal communications headset 10 (e.g., an aviation headset). Reference numbers followed by an "A" or a "B" indicate a feature that corresponds to the right side or the left side, respectively, of the audio device 10. The audio device 10 includes a headband having an arcuate section 130, a right end and a left end. A right housing 132A and a left housing 132B are located at the right end and the left end, respectively, of the headband. The arcuate section 130 serves as an over-the-head bridge between the right and left housings 132. A spring band 134 (e.g., spring steel) extends from the right housing 132A, through the arcuate section 130 and to the left housing 132B. The spring band 134 provides a clamping force to move the housings 132 toward each other (approximately along a horizontal plane through the wearer's head) while the headband is worn by a user. The right and left housings 132 can be moved a distance either up and toward or down and away from the arcuate section 130 to accommodate a smaller or larger head, respectively.

A pad (right pad 136A or left pad 136B, generally 136) is attached to each housing 132 and is used to comfortably secure the headset 10 to the head. As used herein, a "pad" means a compliant member that can compress and/or deform under an applied pressure and that is configured for contact with the head of a user in a manner that supports the headband. In some cases, when the audio device (headset) 10 is worn on the head, each pad 136 extends from its forward end above the ear to its back end, which is lower on the head and behind the ear. In certain cases, the pads 136 each have a contoured surface 138 for contacting the head of the user. A boom 140 extends from a rotatable base 142 near the bottom of one of the housings (e.g., as illustrated, the right housing 132A) and is used to position and support a microphone 144 attached at the other end. The boom 140 may be adjusted, in part, by rotation about its base 142 to place the microphone 144 in proper position with respect to the mouth of the user. The boom 140 may be permanently affixed to the housing 132A or may be removable so that the audio device 10 can be used for both aviation and non-aviation uses (e.g., music playback). A connector 146 for a communications cable extends from the bottom of the right housing 132A. An earpiece (e.g., earbud) connector cable 148 extends at one end from each housing 132. The opposite end of the flexible cable 148 is suitable for connecting to an earpiece such as an earbud or other type of in-ear headphone. Additional features of the audio device 10 in FIG. 2 are described in U.S. Pat. No. 10,187,718, which is entirely incorporated by reference herein.

Figure 3:
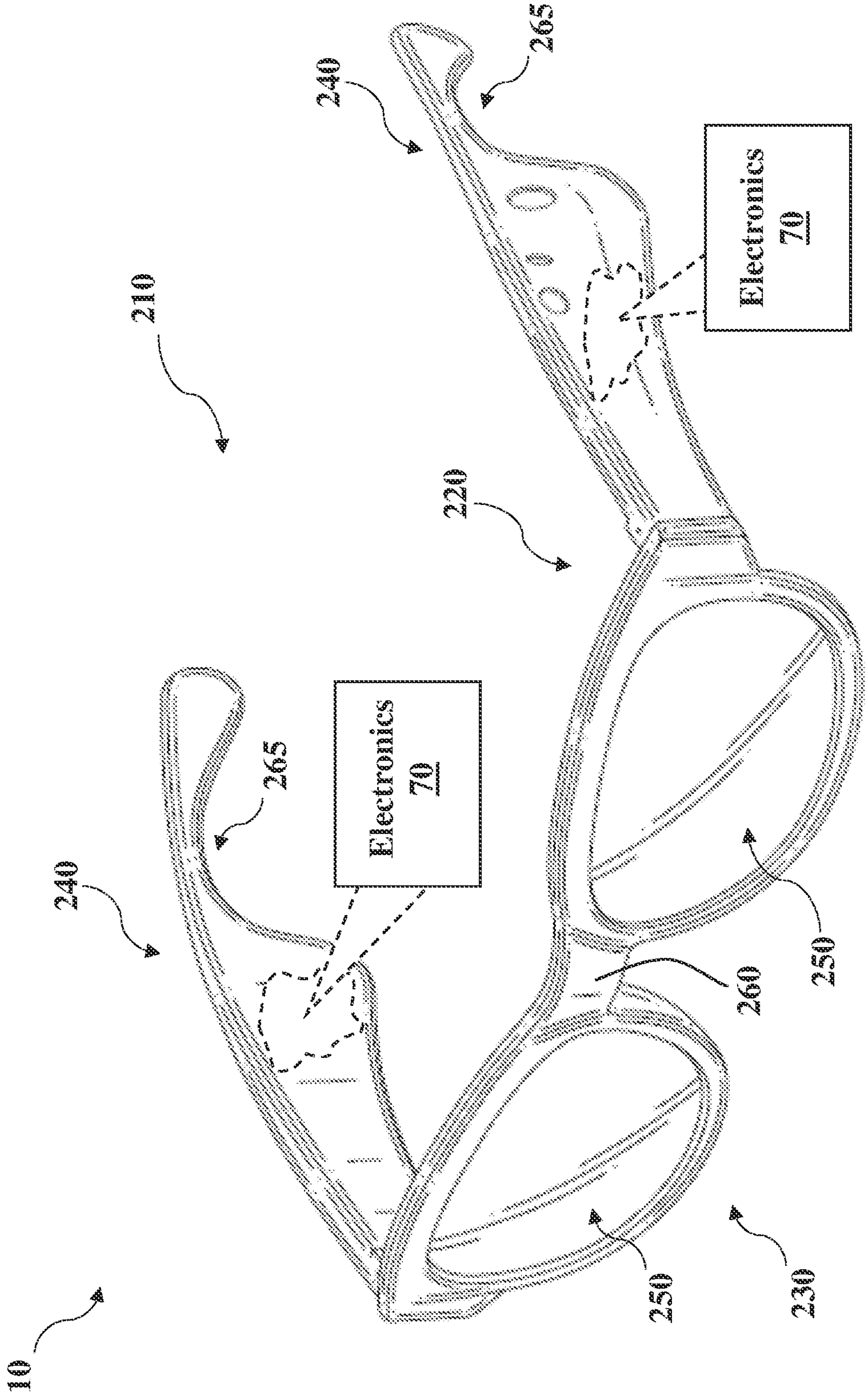
FIG. 3 is a schematic depiction of an additional audio device according to various implementations.

FIG. 3 illustrates an additional example audio device 10, including audio eyeglasses 210. As shown, the audio eyeglasses 210 can include a headband (e.g., frame) 220 having a lens region 230 and a pair of arms 240 extending from the lens region 230. As with conventional eyeglasses, the lens region 230 and arms 240 are designed for resting on the head of a user. The lens region 230 can include a set of lenses 250, which can include prescription, non-prescription and/or light-filtering lenses, as well as a bridge 260 (which may include padding) for resting on the user's nose. Arms 240 can include a contour 265 for resting on the user's respective ears. Contained within the frame 220 (or substantially contained, such that a component can extend beyond the boundary of the frame) are electronics 70 and other components for controlling the audio eyeglasses 210 according to particular implementations. Electronics 70 can include portions of, or connectors for, one or more electronic components as described with respect to the audio devices 10 herein. In some cases, separate, or duplicate sets of electronics 70 are contained in portions of the frame, e.g., each of the respective arms 240 in the frame 220. However, certain components described herein can also be present in singular form.

Figure 4:
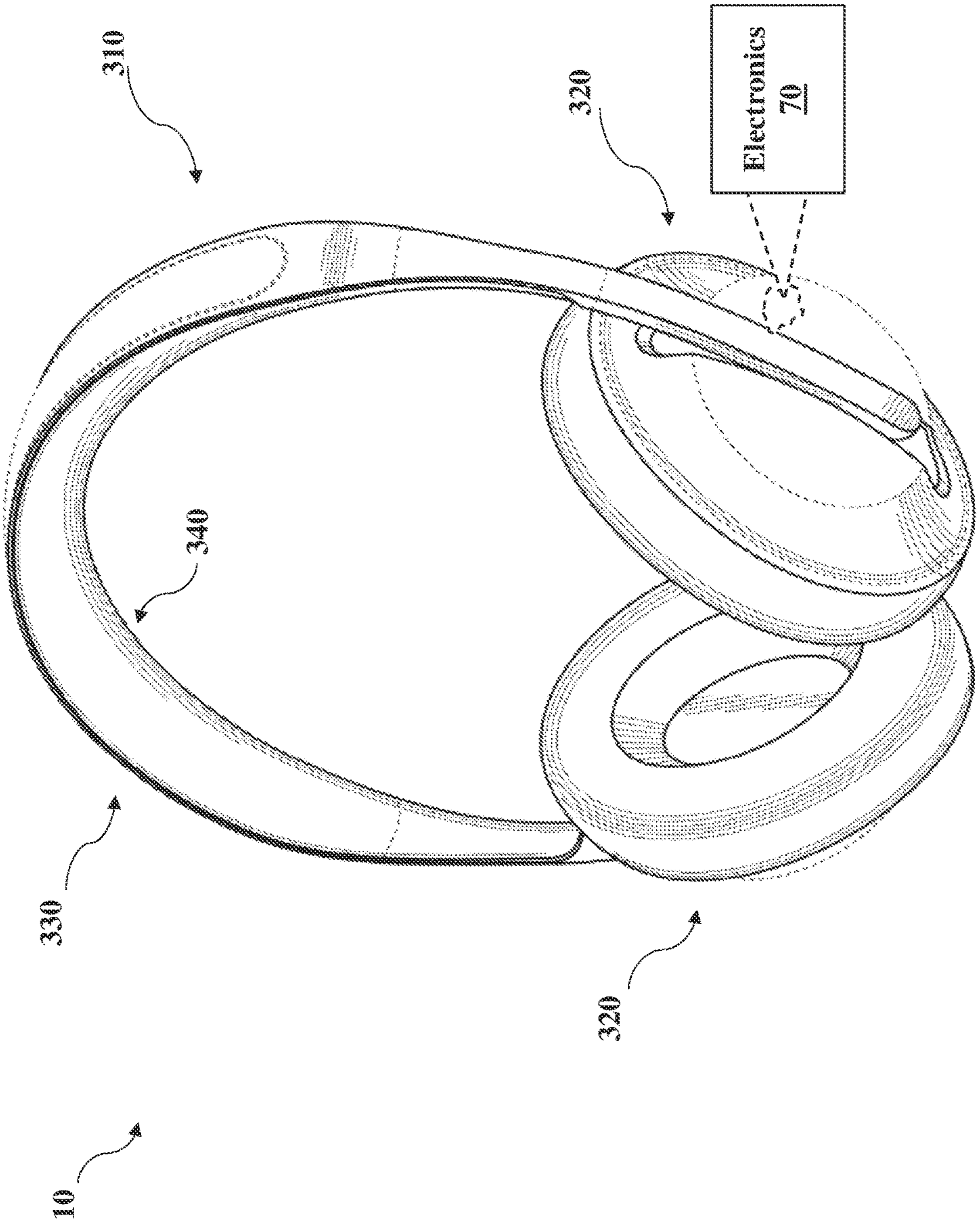
FIG. 4 is a schematic depiction of another audio device according to various implementations.

FIG. 4 depicts another audio device 10, including around-ear headphones 310. Headphones 310 can include a pair of earpieces (e.g., ear-cups) 320 configured to fit over the ear, or on the ear, of a user. A headband 330 spans between the pair of earpieces 320 and is configured to rest on the head of the user (e.g., spanning over the crown of the head or around the head). The headband 330 can include a head cushion 340 in some implementations. Stored within one or both of the earpieces 320 are electronics 70 and other components for controlling the headphones 310 according to particular implementations. Electronics 70 can include portions of, or connectors for, one or more electronic components as described with respect to the audio devices 10 herein. It is understood that a number of wearable audio devices described herein can utilize the features of the various implementations, and the wearable audio devices 10 shown and described with reference to FIGS. 1-4 are merely illustrative.

Figure 5:
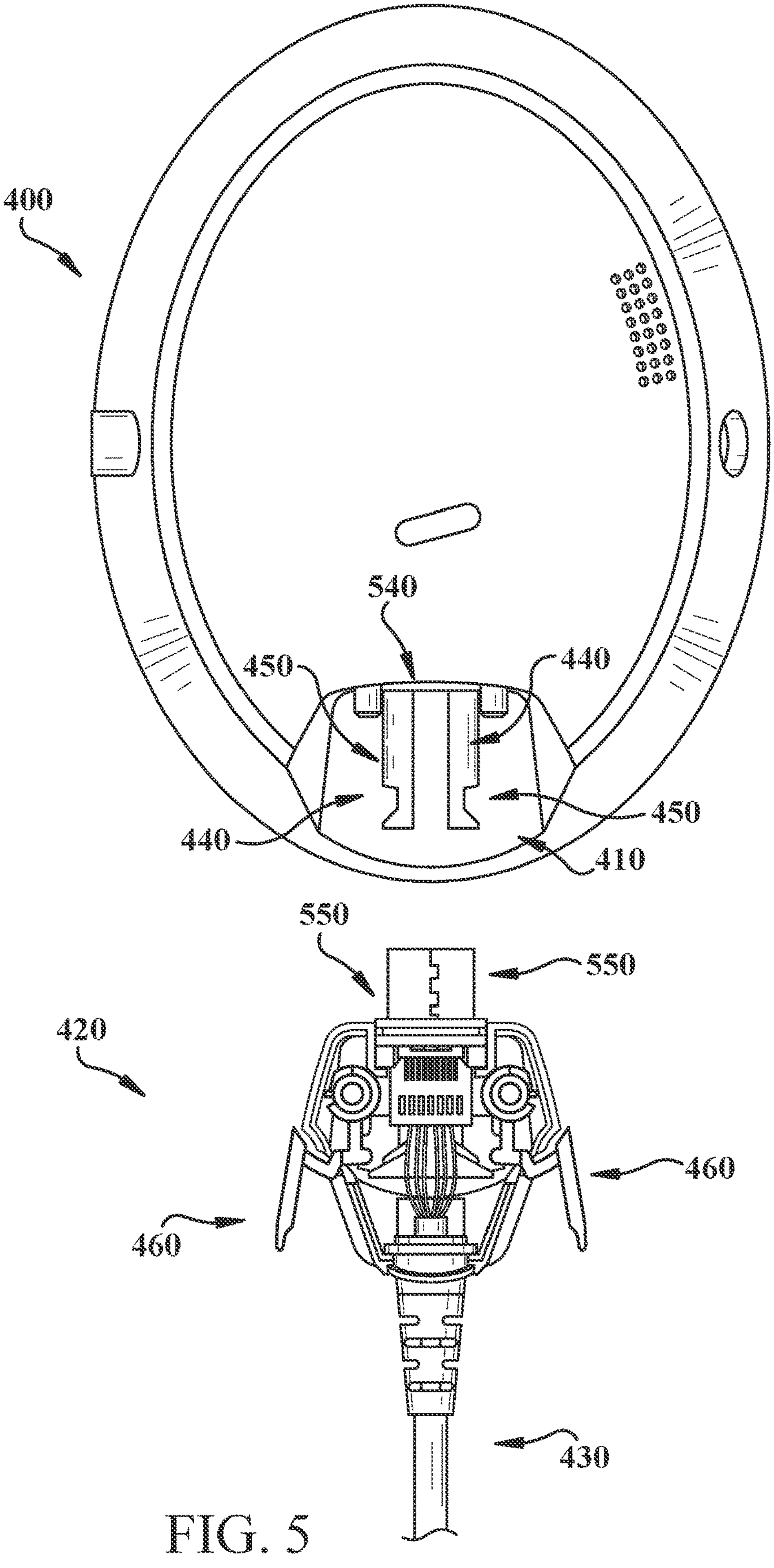
FIG. 5 is a side view of an earpiece and an electronic component according to various implementations.
Figure 6:
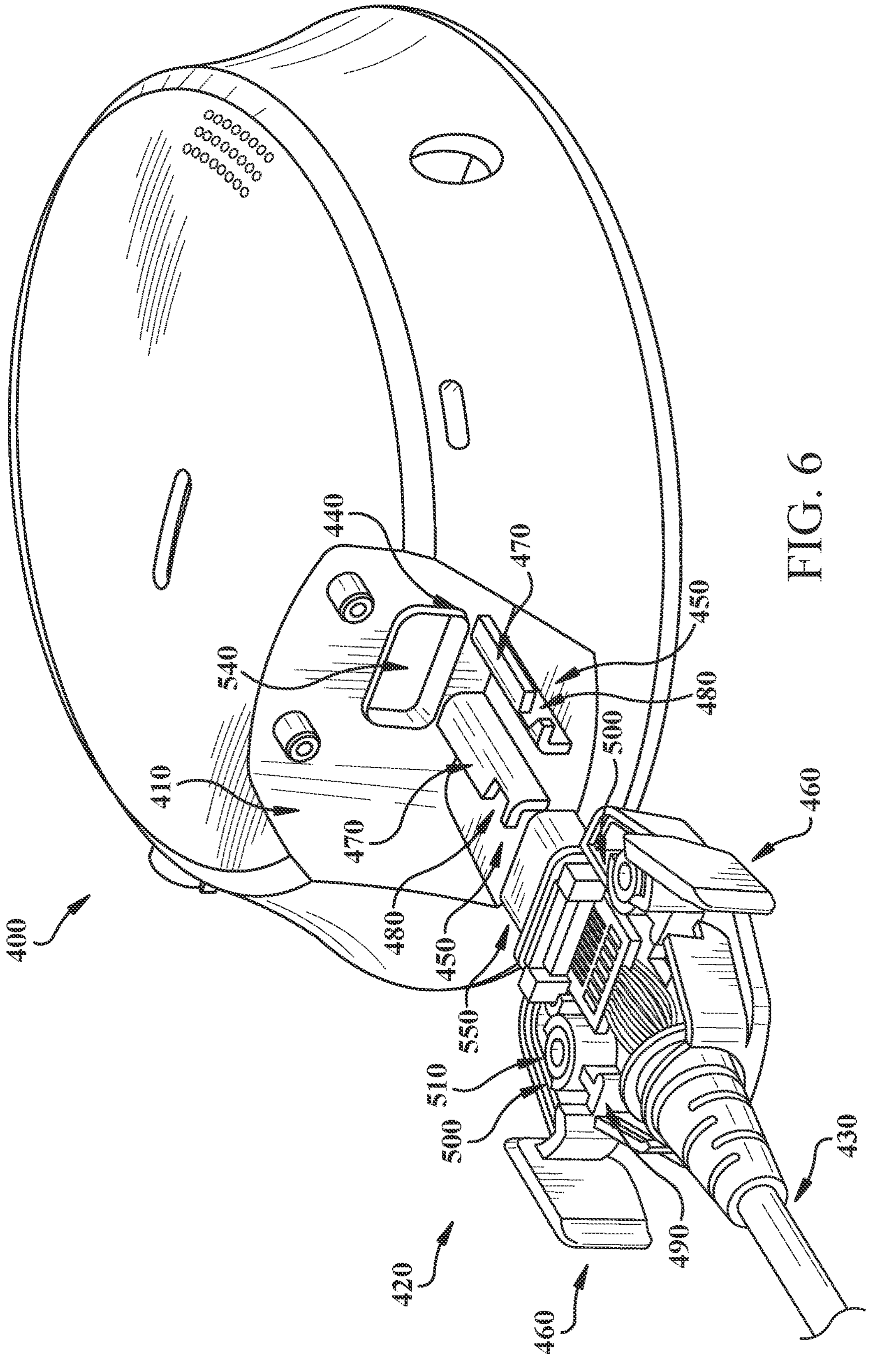
FIG. 6 is a perspective view of an earpiece and an electronic component according to various implementations.

FIGS. 5 and 6 show a side view, and a perspective view, respectively, of an earpiece 400 in an audio device 10 according to various implementations. In some cases, the earpiece 400 includes an ear-cup such as the ear-cup 105 in the aviation headsets in FIGS. 1 and/or 2, or the ear-cup in the over-ear headset shown in FIG. 4. In other cases, the earpiece 400 can represent a portion of an in-ear, or near-ear earpiece that is configured to output audio to the ear of a user, e.g., in the arm 240 of audio eyeglasses shown in FIG. 3.

In this example implementation, the earpiece 400 includes a slot 410 configured to engage an electronic component 420. In this example, the electronic component 420 includes a connector 430 such as a cable connector (e.g., cable connector 120 in FIG. 1). However, the electronic component 420 can take any form capable of selectively engaging the earpiece 400. For example, in some cases, the electronic component 420 includes: a boom microphone, a battery module, a power connector, a sensor module, a communications module (e.g., a Bluetooth module), a self-powered communications module (e.g., self-powered Bluetooth module), and/or a microphone module. While one earpiece 400 is illustrated in various FIGURES herein, it is understood that both earpieces 400 in an audio device 10 can be equipped with a slot 410 for accommodating one or more electronic components 420, e.g., for engaging the same type of electronic component or distinct types of electronic components.

Figure 7:
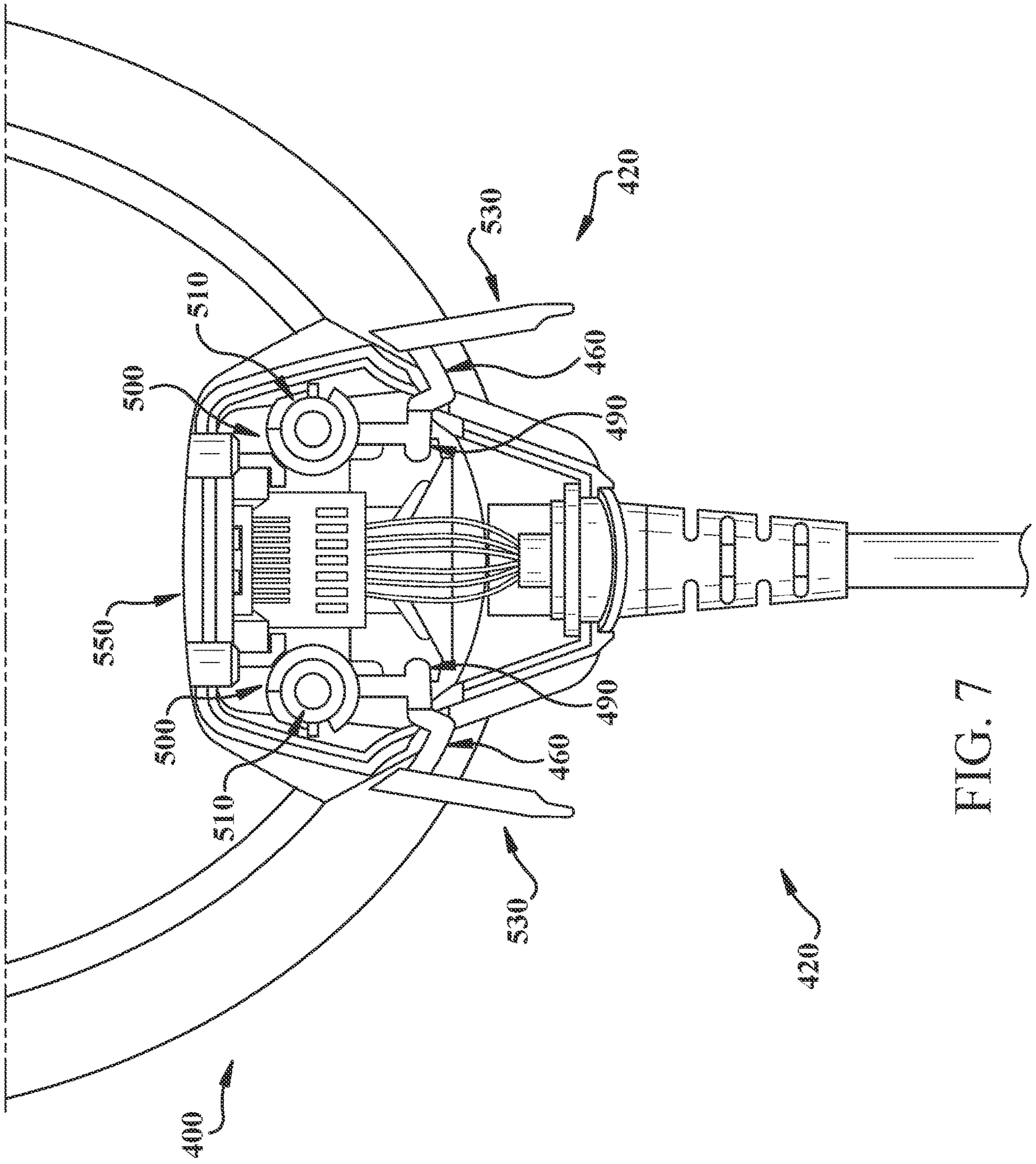
FIG. 7 is a close-up side view of an earpiece engaging an electronic component according to various implementations.
Figure 8:
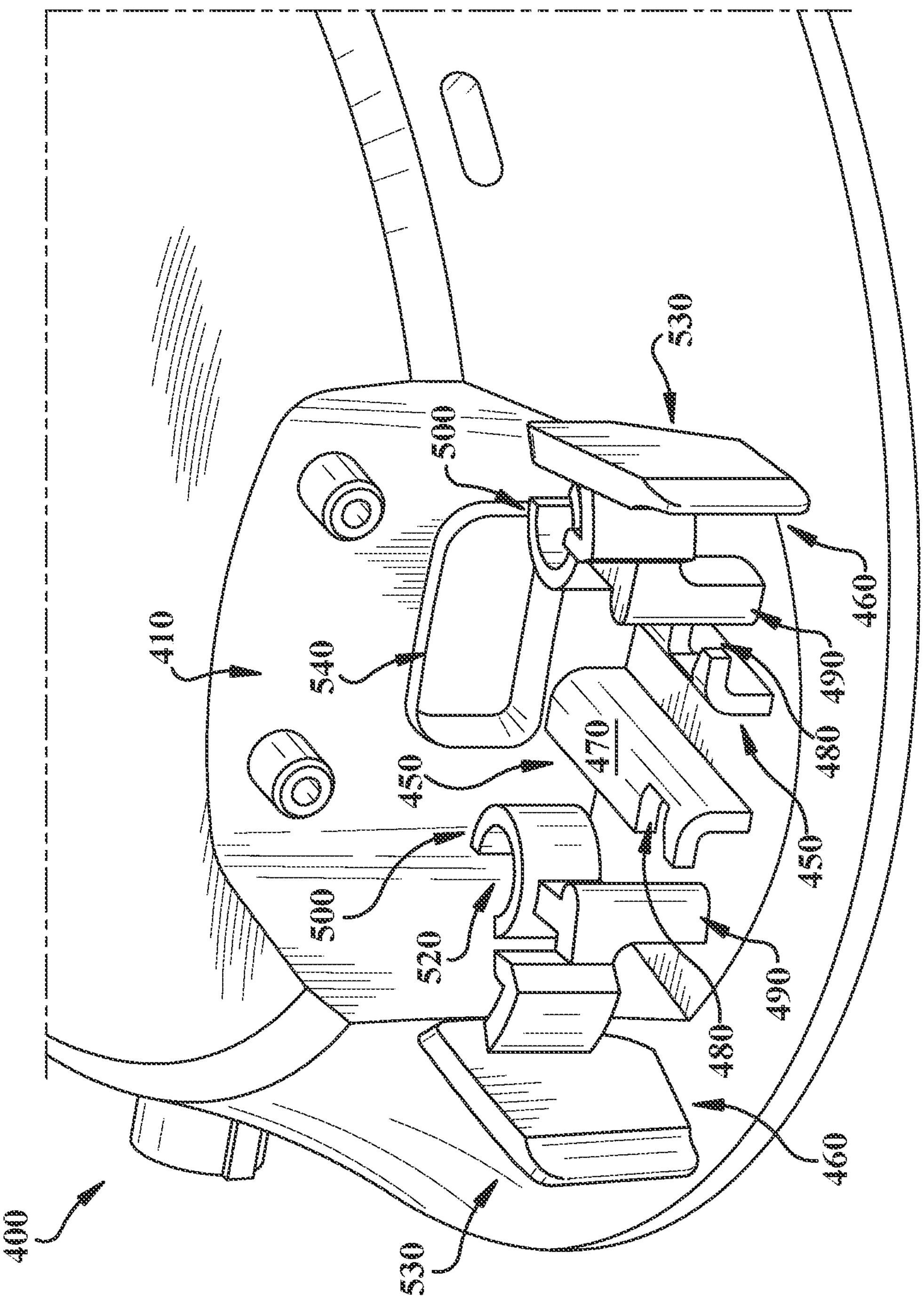
FIG. 8 is a perspective view of a movable arm in isolation with an earpiece according to various implementations.
Figure 9:
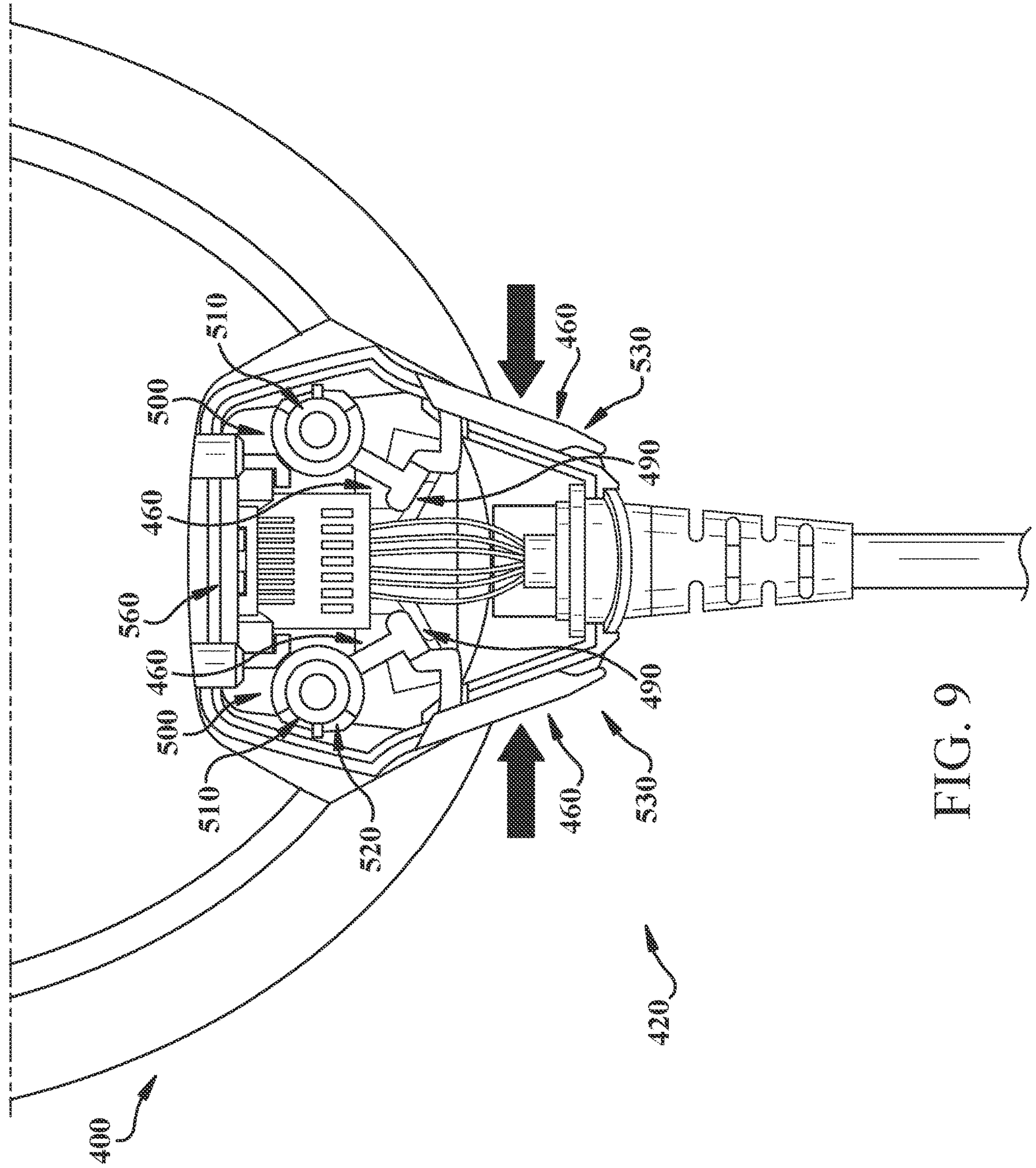
FIG. 9 is a side view of an electronic component engaged with an earpiece according to various additional implementations.
Figure 10:
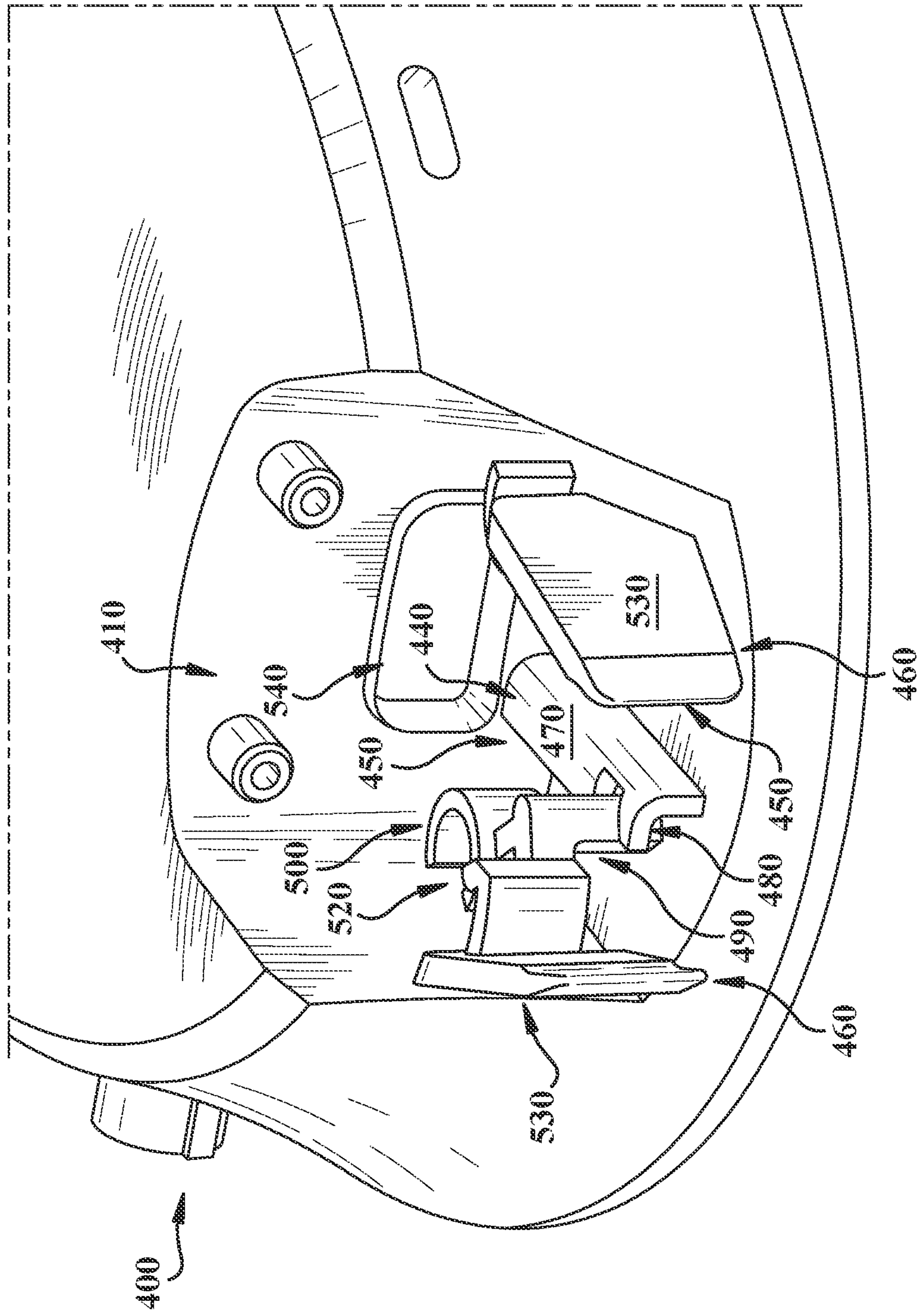
FIG. 10 is a perspective view of the movable arm from FIG. 8, in isolation, and engaged with a protrusion in the electronic component.

In various implementations, the slot 410 includes at least one connector 440 for selectively engaging (e.g., coupling with) the electronic component 420 and retaining the electronic component 420 in contact with the earpiece 400. In certain implementations, the connector 440 includes one or more snap-fit and/or friction-fit connectors. In particular examples, each of the snap-fit connector (s) and/or friction fit connector(s) (or, "connector") 440 includes at least one fixed protrusion 450 within the slot 410 that is sized to complement a movable arm 460 in the electronic component 420 in a locked position. In some examples, the connector 440 includes a plurality of fixed protrusions 450, e.g., a pair of fixed protrusions 450 illustrated in FIGS. 4 and 5 for selectively engaging a pair of movable arms 460 in the electronic component 420. In certain implementations, each fixed protrusion 450 includes a ridge 470 with an opening 480 (FIG. 6) extending at least partially therethrough. In some cases, the movable arm 460 on the electronic component 420 is configured to engage and disengage the opening 480 in the fixed protrusion 450. That is, in certain implementations, the movable arm 460 is configured to engage the opening 480 in the fixed protrusion 450 in a locked position, and disengage the opening 480 in an unlocked position. FIGS. 7 and 8 show side and perspective views, respectively, illustrating the movable arm 460 as it relates to the fixed protrusion 450 in an engaged, but not locked position. FIGS. 9 and 10 show side and perspective views, respectively, illustrating the movable arm 460 as it relates to the fixed protrusion 450 in a locked position. FIGS. 8 and 10 illustrate the movable arm(s) 460 in isolation relative to the fixed protrusion(s) 450.

Figure 11:
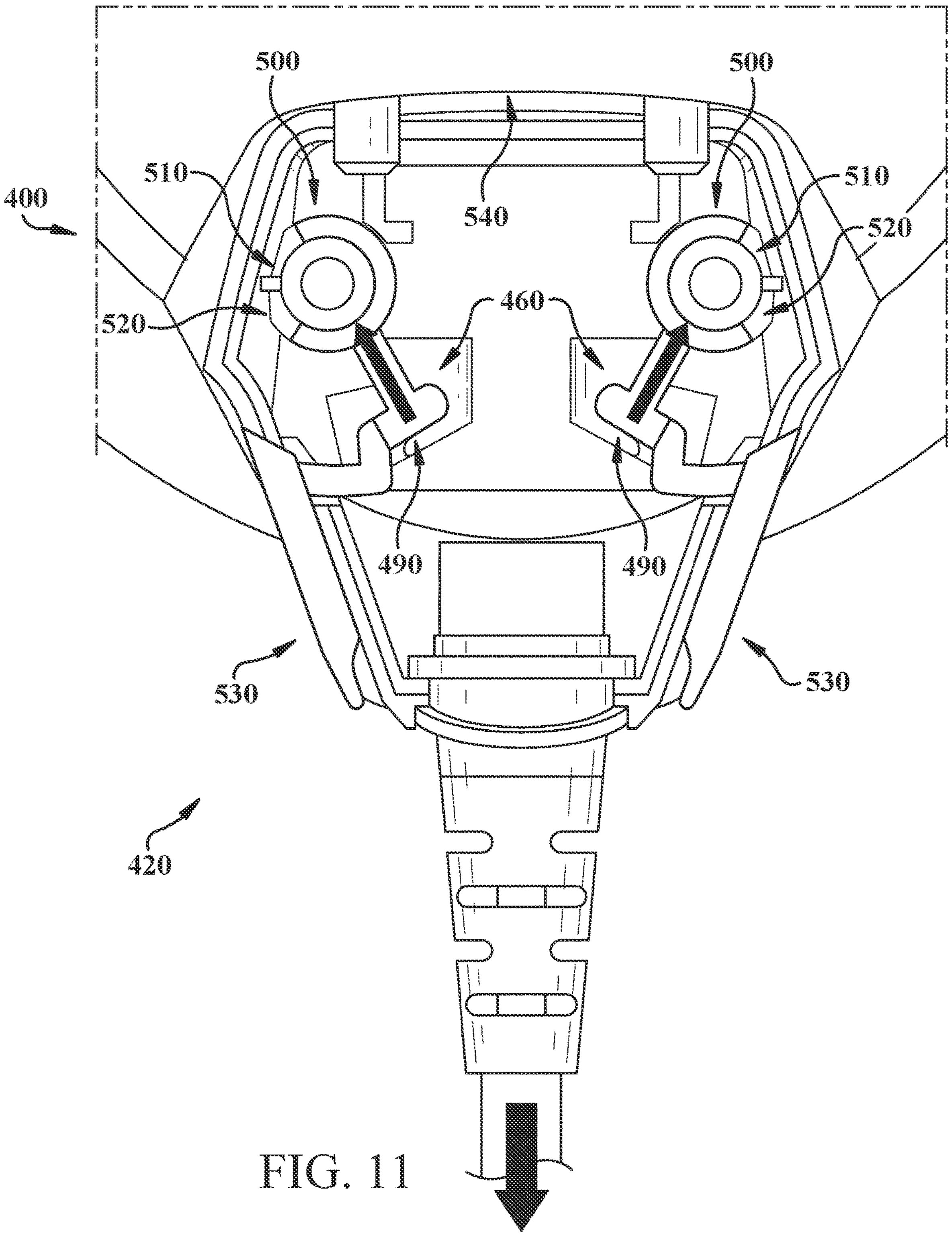
FIG. 11 is a side view of an electronic component engaged with an earpiece, illustrating the resistive force of the movable arms, according to various implementations.

In certain implementations, the movable arm 460 includes a tab (or protrusion) 490 that is shaped to complement the opening 480 in the fixed protrusion 450. That is, in various implementations, the tab 490 is configured to mate with the opening 480 to engage the movable arm 460 with the fixed protrusion 450. In certain cases, the tab 490 is sized to contact the fixed protrusion 450 at one or more surfaces inside the opening 480, and in particular cases, the tab 490 is sized to substantially fill the opening 480 when engaged. Additionally, the movable arm 460 can include at least one rotatable or pivotable member 500 for moving about a fixed pin (or pillar) 510 on the electronic component 420 (FIGS. 7, 9 and 11). The rotatable or pivotable member 500 can include an opening 520 for slidingly engaging the fixed pin (or pillar) 510, e.g., such that the rotatable or pivotable member 500 rotates about the fixed pin (or pillar) 510 to aid in locking the movable arm 460 with the earpiece 400.

With reference to FIGS. 5-10, with particular reference to FIGS. 9 and 10, it can be seen that the connector 440 is aligned to provide a resistive force against the movable arm 460 in response to a downward force on the electronic component 420 when in a locked position. FIG. 11 shows a close-up side view of the electronic component 420 locked in the slot 410. As shown in this depiction, as a downward force (large arrow) is applied to the electronic component 420 in the locked position, the connector 440 provides a resistive force against the arm(s) 460 to maintain coupling between the electronic component 430 and the connector. In certain cases, when in the locked position, the connector 440 alone provides the resistive force needed to prevent downward motion of the electronic component 420 relative to the earpiece 400. That is, in particular cases, the electronic component 420 is configured to be inserted in the slot 410 in a first direction, and when engaged (e.g., locked), the connector 440 alone prevents movement of the electronic component 420 relative to the slot 410 in a second direction that is opposite the first direction. In some cases, the first direction is upward, and the second direction is downward. However, in other cases, the first direction can be into the page (e.g., as depicted in the side view of FIG. 11), while the second direction can be out of the page. In other terms, when engaged, the connector 440 alone substantially retains the electronic component 420 in a locked position with the earpiece 400.

As can be seen in FIGS. 5-11, in various implementations the movable arm(s) 460 include an actuatable section 530 that is accessible from an exterior of the electronic component 420 even when the electronic component 420 is engaged (e.g., in a locked position) with the earpiece 400. That is, when the connector 440 is inserted in the slot 410, the actuatable section 530 of the arm(s) 460 remain external to the slot 410, such that a user can control engaging and disengaging the electronic component 420 from the earpiece 400. In these cases, the user can push or pull the actuatable section(s) 530 to move the arm(s) 460 for engaging and/or disengaging the fixed protrusion 450. That is, in certain cases as depicted in FIGS. 5 and 7, after engaging the connector 440 in the slot 410, the user can apply a clamping or inward force on the actuatable sections 530 to move the arms 460 and lock the arms 460 with the fixed protrusions 450. As described herein, once locked, the connector 440 can only be removed by moving the arms 460 via the actuatable sections 530, e.g., by pulling the actuatable sections 530 outward. In various implementations, actuating the arms 460 can be performed without an external tool, e.g., screwdriver, pliers, wrench, etc. That is, in contrast to conventional external electronic component connections in audio devices, the audio devices 10 have a connector 440 that enables tool-less coupling and decoupling of the earpiece 400 and the electronic component 420. In other words, the electronic component 420 and the earpiece 400 are configured to be coupled and decoupled by hand, without the aid of an external tool.

The example electronic component 420 in FIGS. 5-10 can include any number of electronic components described herein. In some cases, the earpiece 400 forms an acoustic seal around the ear of a user, and/or around the entrance to the ear canal of a user. In certain cases, when connected with the earpiece 400 in the slot 410, the electronic component 420 and the earpiece 400 are positioned to form an acoustic seal around the ear of the user. That is, in various implementations, when the electronic component 420 is engaged with the earpiece 400 (e.g., in the locked position), they collectively seal the earpiece cavity. In certain implementations, such as where the audio device 10 includes noise cancelation capabilities, the acoustic seal around the user's ear can aid in noise cancelation functions. For example, the acoustic seal can aid in passive noise cancelation or reduction (PNC or PNR), and in some cases, can aid in active noise cancelation or reduction (ANC or ANR).

Figure 12:
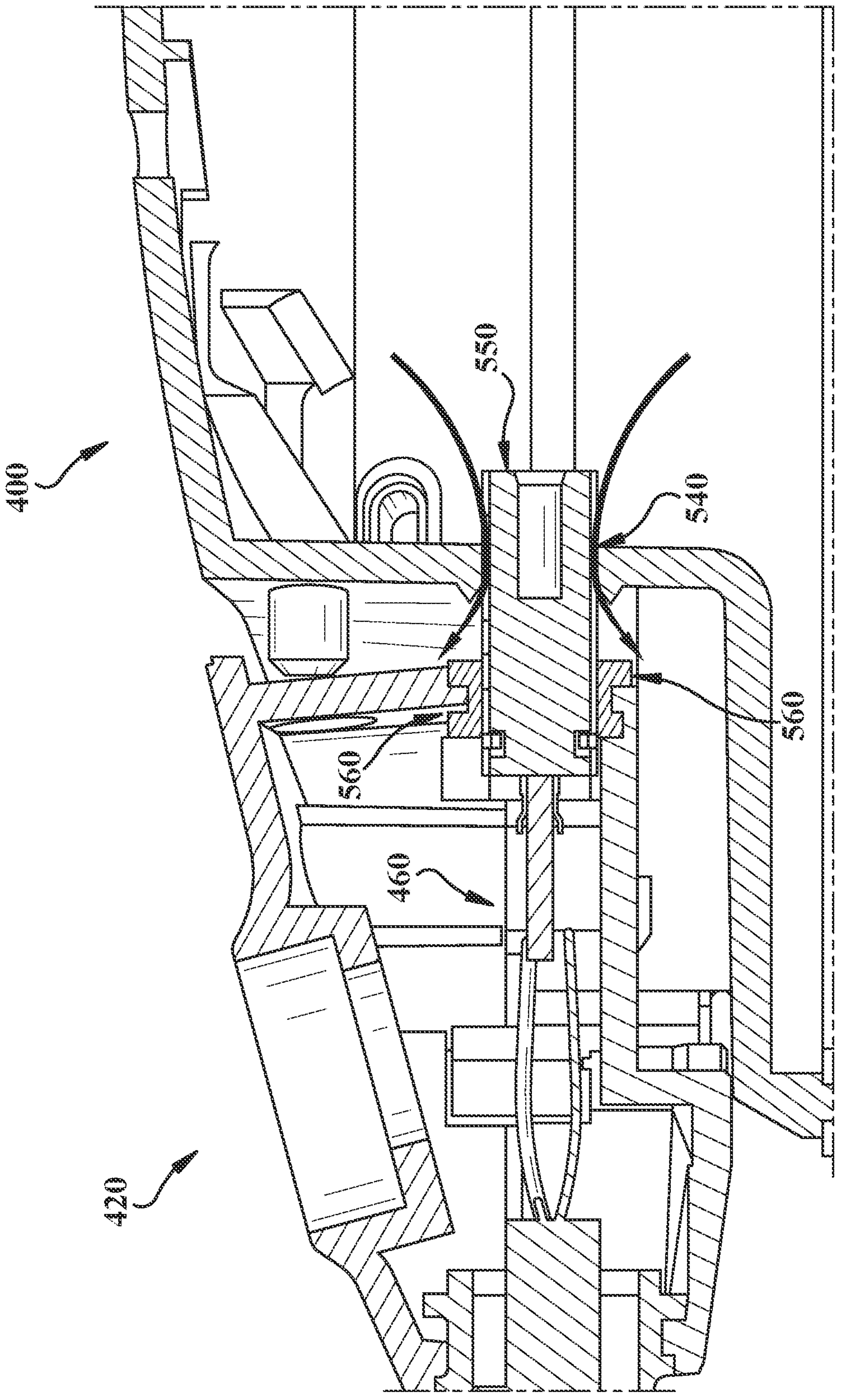
FIG. 12 is a cross-sectional view of an electronic component engaging an earpiece according to various implementations.
Figure 13:
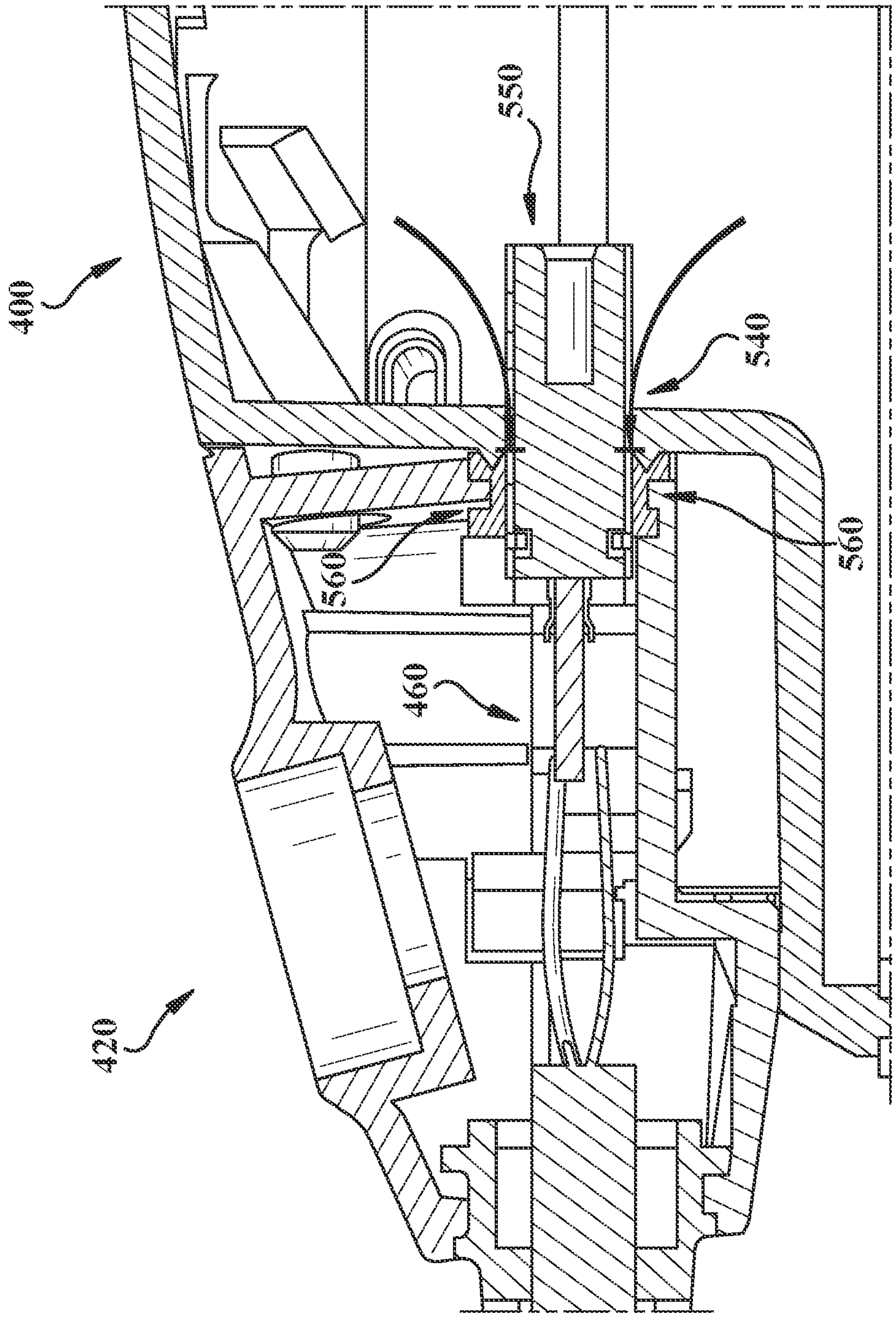
FIG. 13 shows the electronic component and earpiece from FIG. 12, in a locked position.

As can be seen in FIGS. 6, 8 and 10, the earpiece 400 can also include an opening 540 connected with the slot 410 for accommodating an electronic component connection 550 (e.g., FIGS. 5 and 6). In some cases, the electronic component connection 550 includes an electrical and/or data connection, such as a power connection to the earpiece, or a communications or other data connection. FIGS. 12 and 13 show cross-sectional views of portions of the earpiece 400 and the electronic component 420 in two positions, e.g., in a contacting but not locked position in FIG. 12 (similar to FIG. 7), and in an engaged, or locked position in FIG. 13 (similar to FIGS. 9 and 11). In the locked position shown in FIG. 13, the earpiece 400 is configured to engage a gasket 560 proximate the electronic component connection 550 for sealing the electronic component 420 connection with the earpiece 400. In some cases, the gasket 560 surrounds the electronic device connection, and in particular cases, the gasket 560 seals the housing of the electronic component 420 proximate to the electronic component connection 550. In certain cases, the electronic component 420 is potted to additionally seal the electronic component connection 550 and the slot 410 in the locked position (FIG. 13). In certain cases, the sealed electronic component connection 550 approximately isolates electrical noise from movement of the electronic component 420 relative to the earpiece 400. For example, in some cases the electronic component 420 is configured to move relative to the earpiece 400 while in the locked position. For example, where the electronic component 420 includes a boom microphone, the boom microphone can be configured to rotate relative to the earpiece 400. In these cases, the gasket 560 isolates electrical noise from movement of the boom microphone relative to the earpiece 400.

Figure 14:
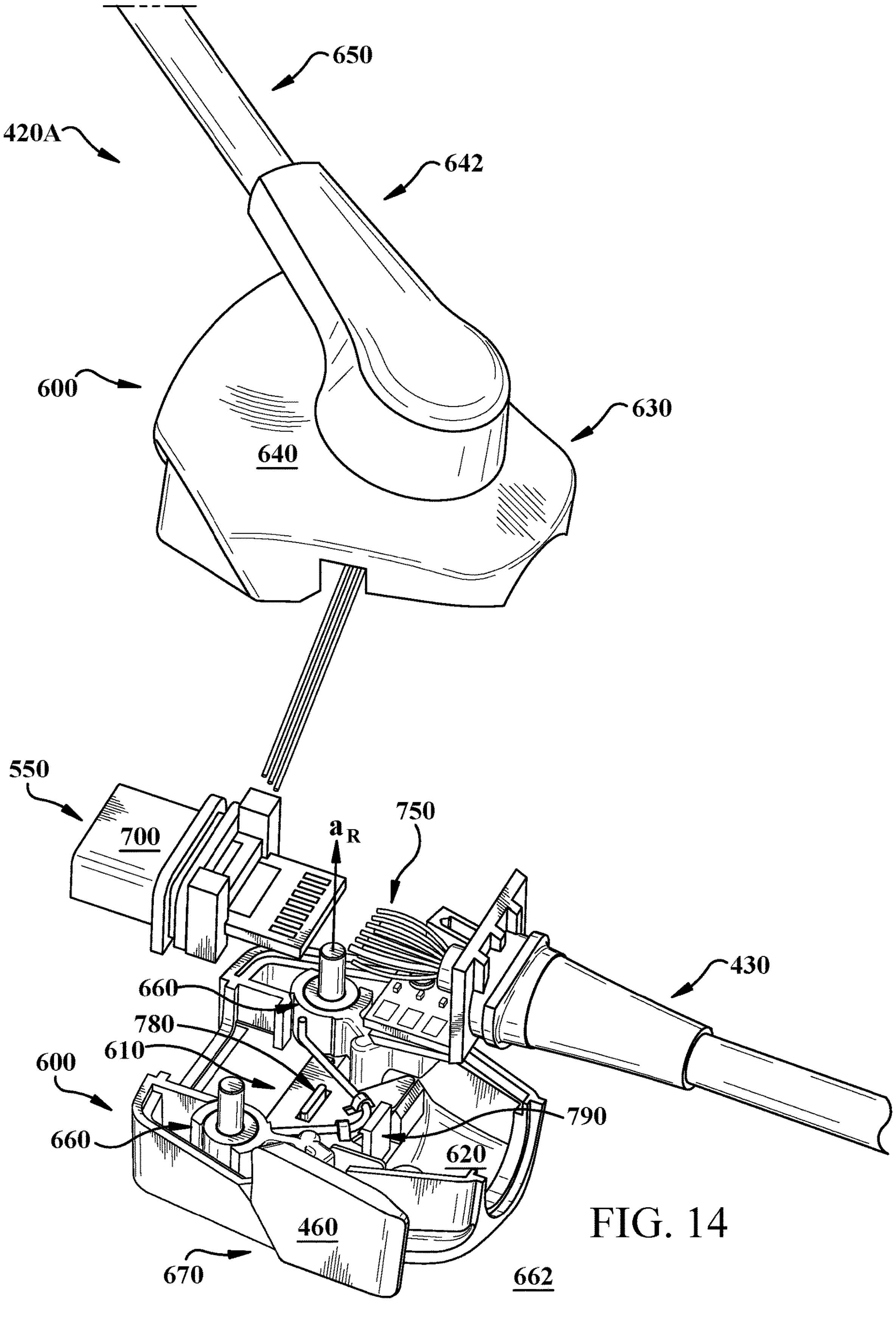
FIG. 14 shows a separated perspective view of an electronic device according to various implementations.
Figure 15:
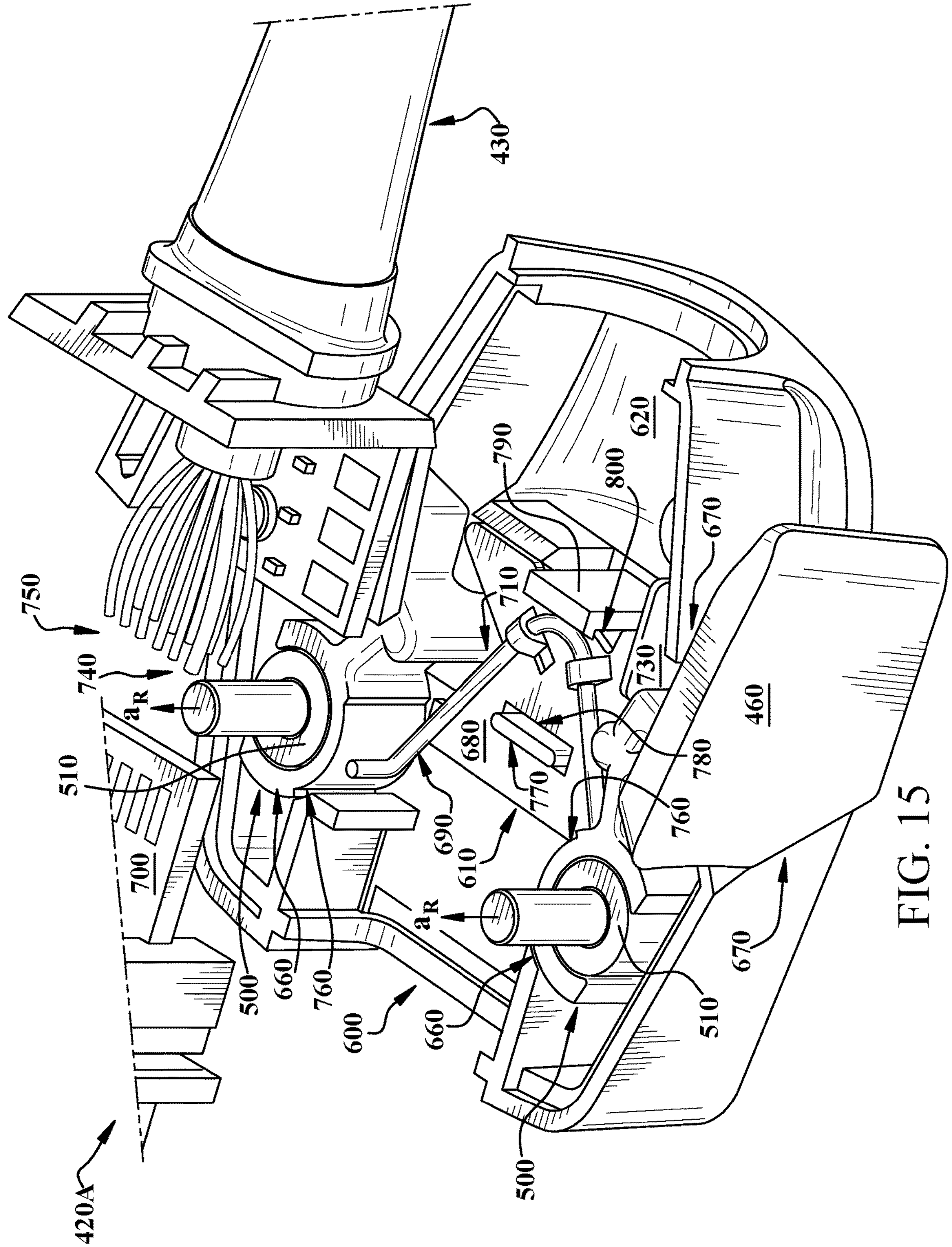
FIG. 15 shows a close-up view of the electronic device in FIG. 14.

FIG. 14 shows a separated perspective view of an electronic device 420A according to various implementations. FIG. 15 shows a close-up view of the electronic device 420A in FIG. 14. In various implementations, the electronic device 420A can include similar features as described with reference to electronic component 420 depicted in FIGS. 5-13 (e.g., similar attachment features such as an electronic component connector 550 and connector 430). Similarly labeled components between the Figures can be considered to be substantially similar in function. Further, as noted with respect to electronic component 420, the electronic device 420A can include a connector 430 such as a cable connector (e.g., cable connector 120 in FIG. 1). However, the electronic device 420A can take any form capable of selectively engaging another component such as an audio headset component. In this example, the electronic device 420A can take any form capable of selectively engaging the earpiece 400. For example, in some cases, the electronic device 420A includes: a boom microphone, a battery module, a power connector, a sensor module, a communications module (e.g., a Bluetooth module), a self-powered communications module (e.g., self-powered Bluetooth module), and/or a microphone module. While one earpiece 400 is illustrated in various FIGURES herein, it is understood that both earpieces 400 in an audio device 10 can be equipped with a slot 410 for accommodating one or more electronic components 420A, e.g., for engaging the same type of electronic component or distinct types of electronic components.

Figure 16:
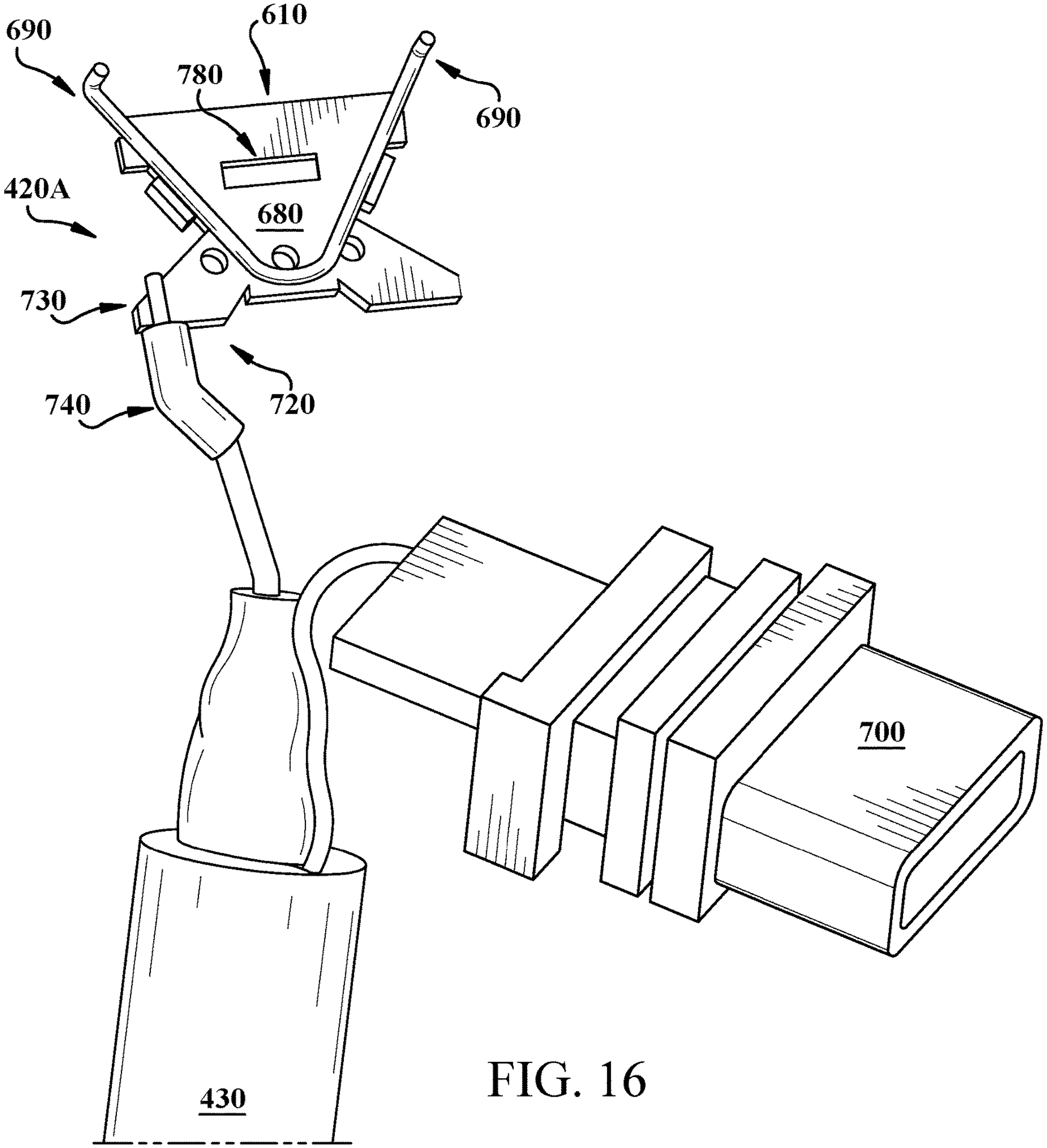
FIG. 16 illustrates a detent spring separated from a housing in an electronic device according to various implementations.

Turning to FIGS. 14 and 15, in various implementations, the electronic device 420A includes a housing 600 with a detent spring 610 internal to the housing 600. FIG. 16 illustrates a depiction of the detent spring 610 separated from the housing 600, making certain features of that detent spring 610 more easily visible. FIGS. 14-16 are referred to simultaneously.

In certain implementations, the housing 600 includes one or more sections housing internal components such as the detent spring 610. For example, as illustrated in FIG. 14, the housing 600 includes a base 620 and a cap 630 that fits over the base, e.g., to enclose components in the housing 600, provide ingress protection, etc. In certain cases, the cap 630 includes an outer surface 640, e.g., an outermost surface of the housing 600 when the component 420A is coupled with a headset (e.g., at earpiece 400). In some cases, the cap 630 can include an accessory component 642, e.g., a boom microphone 650 in the example depicted in FIG. 14. In other cases, the cap 630 can include an interface, button, tactile feature (e.g., treads), etc. As noted herein, in particular cases, the detent spring 610 is internal to the housing 600, such that the detent spring 610 is contained within the walls of the housing 600.

In various implementations, the detent spring 610: (i) is positioned to contact a feature 660 that is at least partially external to the housing 600 (e.g., external area labeled 662), and (ii) function as an ESD sink for the component 420A and/or the connected device (e.g., earpiece 400). In particular cases, the feature 660 extends through the housing 660, e.g., through a slot 670 in the housing 600 (illustrated as slot 670 in the base of housing 600, or through a sidewall of the housing 600). In one example, the feature 660 includes one or more movable arms 460 as described with reference to electronic component 420 (FIGS. 11, 12). In various implementations, the feature 660 (e.g., movable arm(s) 460) includes a metal. In additional implementations, the feature 660 can include a plastic or a composite. In particular cases, the detent spring 610 directly contacts the feature 660.

In certain examples, the detent spring 610 includes a plate 680 coupled to the housing 600. In some cases, as depicted in FIGS. 14 and 15, the plate 680 is coupled to the base 620 of the housing 600. In other cases, the plate 680 is coupled to sidewalls of the housing 600 and/or the cap 630. In particular examples, the detent spring 610 also includes a set of arms 690 extending from the plate 680 that are positioned to contact the feature 660. In some examples, the set of arms 690 includes two arms, one for contacting each of two features 660 (e.g., movable arms 460). In certain non-limiting examples, the set of arms 690 only contact the features 660, i.e., only directly contact the features 660. In other examples, the set of arms 690 can at least partially rest on the housing 600 but primarily contact the features 600. In some aspects, each arm 690 can include one or more segments, e.g., connected by a contour, bend, etc. In particular cases, an outer surface of each arm 690 that contacts the feature 600 is rounded. In some examples, the arms 690 are part of a single, continuous component that includes a bend to provide a spring-like force (e.g., outward force) against the feature(s) 660. In other cases, the arms 690 are separate components configured to provide a force against the features 660. In particular examples, the detent spring 610 includes, or is substantially formed of, a metal. In other cases, the detent spring 610 includes a non-metal. In any case, the detent spring 610 includes a conductive material, e.g., an electrically conductive material that can function as an ESD sink.

As noted herein, according to certain implementations, the detent spring 610 acts as a limiter for the feature 660 and provides ESD protection for components in the housing 600. For example, the feature 660 can enable coupling of the electronic device 420A with an audio headset, e.g., earpiece 400. In such cases, the detent spring 610 can act as a limiter for the feature 660, e.g., limiting rotation of the movable arms 460. Further, the detent spring 610 can act as an ESD sink for the feature 660, for example, providing an ESD path from the feature 660 to a ground plane or ground path (e.g., in the connector 430). In such cases, an ESD event (also called an ESD strike) at the feature 660 (either within the housing 600 or external to the housing 600) can be directed through the detent spring 610 to a ground plane or path, away from other electronics in the headset.

In examples where the electronic device 420A is configured to couple with an audio headset (e.g., earpiece 400), the housing 600 can further include a data connector 700 for connecting with a complementary data connector in the audio headset (e.g., in earpiece 400). In certain cases, the data connector 700 is similar to the electronic component connection 550 in FIGS. 5 and 6, including an electrical and/or data connection, such as a power connection to the earpiece, or a communications or other data connection. In particular cases, the data connector 700 can include a USB connector and/or an audio connector for facilitating data and/or audio communication between the electronic device 420A and the earpiece 400. In certain cases, as illustrated in the partial cut-away view of the electronic device 420A (with cap 630 removed) in FIG. 17, the detent spring 610 is located proximate to an opening 710 in the electronic device 420A, for example, an opening 710 in the base 620. In certain cases, the opening 710 is on a back side of the housing 600, e.g., a side opposite the cap 630. In particular cases, this opening 710 is obstructed on a first side by the cap 630 when the electronic device 420A is assembled, and is obstructed on a second side (e.g., back side of housing 600) when the electronic device 420A is coupled with the headset (e.g., earpiece 400). Because electrostatic charge can flow through paths of low resistance, openings and associated airways or passageways in devices can provide opportunities for ESD events. For example, the opening 710 can provide an opportunity for an ESD event between one or more components in the earpiece 400 and one or more components in the electronic device 420A. Beneficially, the detent spring 610 is proximate to the opening 710 and can provide ESD protection to the headset (e.g., earpiece) through the opening 710. That is, the detent spring 610 can act as an ESD sink for electrostatic charge transmitted through the opening 710 and/or proximate to the opening 710.

In various implementations, the detent spring 610 provides ESD protection to the electronic device 420A and connected components (e.g., earpiece 400 and associated headset) of approximately 15 kilo-volts (kV) or more. In such cases, the detent spring 610 can provide sufficient ESD protection to the headset to comply with an aviation and/or military ESD standard, e.g., a United States Federal Aviation Administration (FAA) ESD standard or threshold for aviation headsets. In various implementations, the detent spring 610 provides ESD protection as an ESD sink, or electrostatic charge outlet. For example, looking at FIGS. 15 and 16, the detent spring 610 can be grounded by a ground connection 720 in the electronic device 420A. In particular cases, the ground connection 720 includes a ground tab 730 that is connected to a grounding plane 740 in the connector 430. In some cases, the ground tab 730 includes a metal or other conducting tab, e.g., a solder tab. In certain aspects, the ground tab 730 contacts the grounding plane 740 in the connector 430, which in the example depicted in FIG. 15, is a grounding wire. In certain additional cases, the detent spring 610 further contacts the housing 600 and wiring 750 in the housing 600, e.g., the ground tab 730 contacts the grounding plane (wire) 740.

Figure 17:
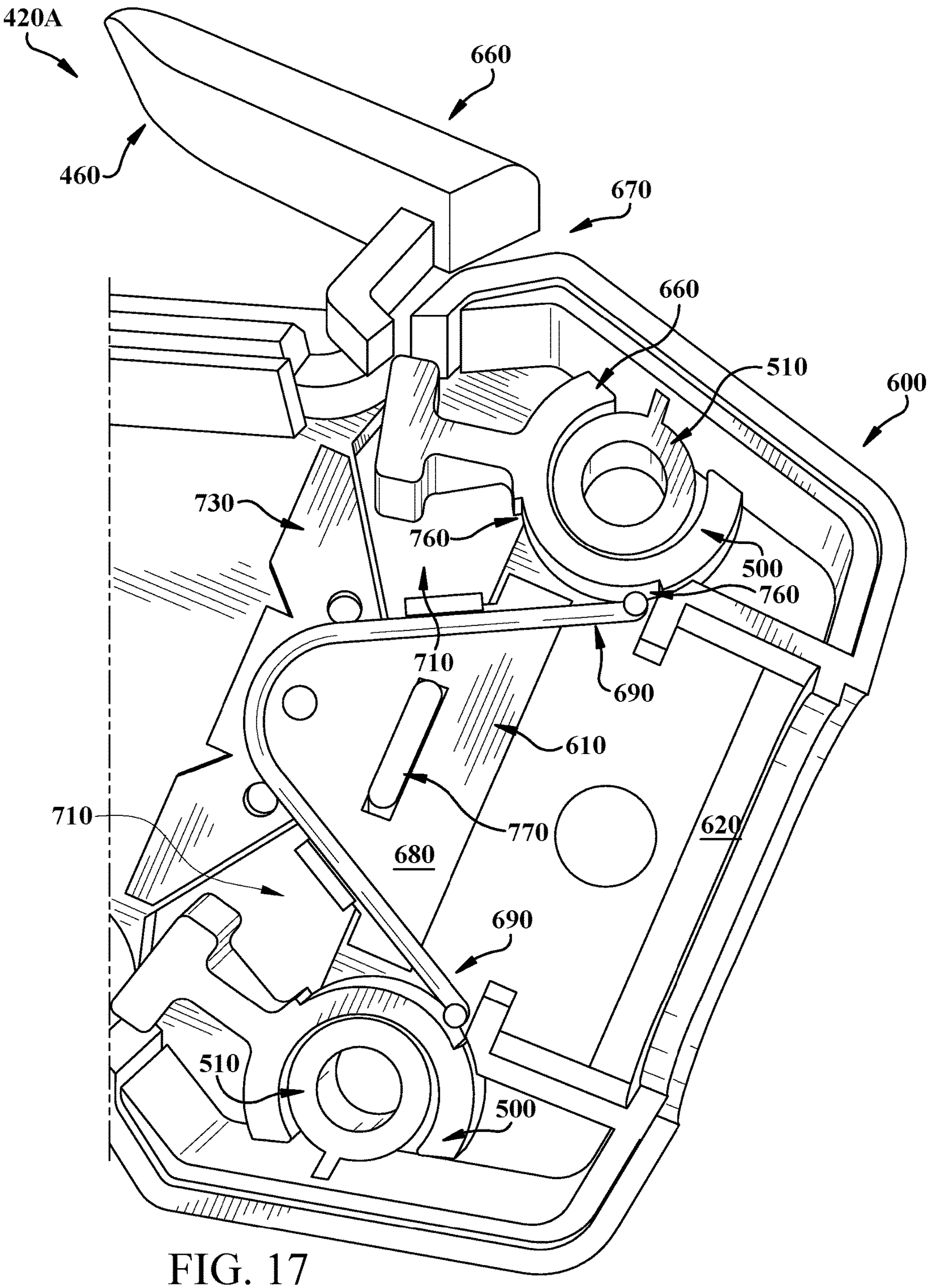
FIG. 17 shows an additional close-up view of the electronic device in FIGS. 14-16.

FIGS. 15-17 show further detail of the interaction between the detent spring 610 and the feature 660, in particular the arms 690 and the feature 660 that is at least partially external to the housing 600. In operation, the arms 690 of the detent spring 610 are positioned to contact the feature 660 within the housing 600. As noted herein, the feature 660 can include a rotating (or pivotable) member 500 of a movable arm 460 and provide friction against movement of the movable arm 460. The pivotable member 500 can pivot, or rotate, about the fixed pin (or pillar) 510, while the arm 690 of the detent spring 610 contacts the pivotable member 500. In various implementations, the detent spring 610 (i.e., each arm 690) provides a force against each pivotable member 500 that is normal to an axis of rotation ($a_R$) of the pivotable member 500. In certain cases, for example as shown in FIGS. 15 and 17, each pivotable member 500 can include a recess 760 for accommodating an arm 690 of the detent spring 610. In certain cases, the recess 760 spans only portion of the circumference about the axis of rotation ($a_R$) of the pivotable member 500, e.g., approximately 30 degrees to approximately 120 degrees, based on an amount that the arm 690 is configured to rotate. In particular cases, the frictional force applied against each pivotable member 500 mitigates vibrational movement, or rattling, of the pivotable member 500 and/or the connected moveable arm 460. For example, during use of a headset including the electronic device 420A, the detent spring (in particular, arms 690) provides sufficient frictional force against the moveable arms 460 (in particular, at pivotable member 500) to mitigate rattling that can be caused by environmental factors such as vibration and/or acoustic energy, as well as looseness in the interface between the pivotable member 500 and the fixed pin 510 that can result from use over time.

As noted herein, in some cases the detent spring 610 includes arms 690 extending from the plate 680 that are positioned to contact the feature 660. Other types of detent spring, with distinct configurations, are also possible. Looking at the example of the electronic device 420A in FIGS. 15 and 16, a first positional feature 770 is located on the housing 600 and a second positional feature 780 is located on the detent spring 610. In particular cases, the first positional feature 770 and the second positional feature 780 are complementary and aid in maintaining a position of the detent spring 610 relative to the housing 600. For example, the first positional feature 770 and the second positional feature 780 can include male/female protrusions/slots for interfacing and limiting movement of the detent spring 610 relative to the housing 600. In certain cases, the positional features 770, 780 engage one another to align the detent spring 610 in a beneficial position in the housing 600, e.g., such that the arms 690 contact the feature 660 (for example, at the recess 760). In some implementations, the electronic device 420A further includes a first retention feature 790 on the housing 600 and a second retention feature 800 on the detent spring 610, for example, to retain the detent spring 610 against the housing 600. In certain aspects, the retention features 790, 800 are complementary, and in particular examples, include snap-fit and/or friction-fit connections for retaining the detent spring 610 against the housing 600. In some cases, the retention features 790, 800 mitigate movement (e.g., rattling) of the detent spring 610 relative to the housing 600 during use in high-vibration environments, e.g., aviation and/or military use.

In contrast to conventional devices, the audio devices and associated electronic devices according to various implementations provide a number of benefits. For example, the electronic devices disclosed herein can provide ESD protection for connected devices such as connected audio devices. Further, the electronic devices disclosed herein can enhance the fit of components in an audio device such as a headset by providing frictional force against movable components. In some examples, audio devices employing the electronic device can benefit from a detent spring that has two beneficial functions: as a vibration reducer, and as an ESD sink. The audio devices shown employing the electronic device according to various implementations can enhance the user experience, as well as improve performance, relative to conventional audio devices.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. An electronic device, comprising:

a housing; and a detent spring internal to the housing, wherein the detent spring i) is positioned to contact a feature that is at least partially external to the housing and ii) functions as an electrostatic discharge (ESD) sink, and wherein the detent spring further acts as a limiter for the feature and provides ESD protection for components in the housing.

2. The electronic device of claim 1, wherein the detent spring is contained in the housing and directly contacts the feature that is at least partially external to the housing.

3. The electronic device of claim 1, wherein the feature external to the housing enables coupling of the electronic device with an audio headset.

4. The electronic device of claim 3, wherein the housing includes a data connector for connecting with a complementary data connector in the audio headset.

5. The electronic device of claim 3, wherein the detent spring is proximate to an opening in the electronic device and is configured to provide ESD protection for the audio headset through the opening, wherein the opening is obstructed when the electronic device is coupled with the audio headset.

6. The electronic device of claim 1, wherein the detent spring provides ESD protection of approximately 15 kilovolts (kV) or more to the electronic device.

7. The electronic device of claim 1, wherein the detent spring is grounded via a ground connection in the electronic device.

8. The electronic device of claim 1, wherein the feature that is at least partially external to the housing includes at least one movable arm for engaging a slot in a wearable audio device.

9. The electronic device of claim 1, wherein the detent spring further contacts the housing and wiring in the housing.

10. The electronic device of claim 1, wherein the feature external to the housing includes a movable external component that includes a metal, and wherein the detent spring directly contacts the movable external component.

11. The electronic device of claim 1, wherein the detent spring further includes a plate coupled to the housing and a set of arms extending from the plate and contacting the feature external to the housing.

12. The electronic device of claim 1, wherein the detent spring includes a set of arms and wherein the set of arms only contact the feature external to the housing.

13. The electronic device of claim 1, wherein a portion of the housing is configured to be inserted into a slot in a wearable audio device in an insertion direction, the slot having one or more snap-fit and/or friction-fit connectors, wherein the feature external to the housing includes a component having a movable arm configured to selectively engage the one or more snap-fit and/or friction-fit connectors, and wherein, when the movable arm is engaged with the one or more snap-fit and/or friction-fit connectors, the one or more snap-fit and/or friction-fit connectors provide a resistive force against the movable arm in response to a force on the portion in a direction opposite the insertion direction.

14. The electronic device of claim 13, wherein each of the snap-fit and/or friction-fit connectors comprises at least one fixed protrusion within the slot that is sized to complement the movable arm in the electronic component in the locked position.

15. The electronic device of claim 1, wherein the detent spring acts as an ESD sink for the feature that is at least partially external to the housing.

16. An electronic device, comprising:

a housing; and a detent spring internal to the housing, wherein the detent spring i) is positioned to contact a feature that is at least partially external to the housing and ii) functions as an electrostatic discharge (ESD) sink, and wherein the feature external to the housing enables coupling of the electronic device with an audio headset.

17. The electronic device of claim 16, wherein the housing includes a data connector for connecting with a complementary data connector in the audio headset.

18. An electronic device, comprising:

a housing; and a detent spring internal to the housing, wherein the detent spring i) is positioned to contact a feature that is at least partially external to the housing and ii) functions as an electrostatic discharge (ESD) sink, and wherein the feature that is at least partially external to the housing includes at least one movable arm for engaging a slot in a wearable audio device.

19. The electronic device of claim 18, wherein the detent spring further contacts the housing and wiring in the housing.

* * * * *